United States Patent [19]

Härle et al.

[11] 4,058,938

[45] Nov. 22, 1977

[54] METHOD AND APPARATUS FOR GRINDING THE TOOTH FLANKS OF INTERNALLY-TOOTHED GEAR WHEELS

[75] Inventors: Hermann Härle; Siegfried Eisenmann, both of Aulendorf, Germany

[73] Assignee: Furstlich Hohenzollernsche Huttenver Waltung Laucherthal, Germany

[21] Appl. No.: 392,501

[22] Filed: Aug. 29, 1973

Related U.S. Application Data

[63] Continuation-in-part of Ser. No. 173,110, Aug. 19, 1971, Pat. No. 3,782,040.

[30] Foreign Application Priority Data

Aug. 30, 1972 Germany .................... 2242610

[51] Int. Cl.² .................... B23F 5/08; B23F 5/10
[52] U.S. Cl. .................... 51/287; 51/33 R; 51/52 R; 90/3; 90/8
[58] Field of Search .................... 51/33 R, 33 W, 52 R, 51/67, 95 GH, 105 R, 287, DIG. 1; 90/3, 8, 7

[56] References Cited

U.S. PATENT DOCUMENTS

| 1,817,405 | 8/1931 | Braren | 51/287 X |
| 2,038,665 | 4/1936 | Miller | 51/95 GH |
| 2,665,612 | 1/1954 | Nubling | 90/3 |
| 2,861,502 | 11/1958 | Caubet | 90/3 |
| 3,782,040 | 1/1974 | Harle et al. | 51/52 R |
| Re. 20,063 | 8/1936 | Miller | 90/8 |

*Primary Examiner*—James L. Jones, Jr.
*Assistant Examiner*—K. J. Ramsey
*Attorney, Agent, or Firm*—James E. Bryan

[57] ABSTRACT

A method for grinding the tooth flanks of a roughed-out, annular, internally-toothed gear wheel wherein the pitch circle of the internally-toothed gear wheel is rotated about or rolled off a fixed circle having a diameter equal to the pitch circle of an externally-toothed pinion, adapted to mesh with the finished internally-toothed gear wheel; and, simultaneously with the rotation of the gear wheel, a grinding wheel is rotated on an axis parallel to the plane of the gear wheel, is reciprocated through the interior of the gear wheel along an axis parallel to the axes of the pitch circle of the gear wheel and the fixed circle and maintained a fixed distance from the axis of the fixed circle, except for normal, infeed, and has a circumferentially-disposed grinding surface whose cross-sectional profile is equivalent to the profile of at least a part of the profile of at least one tooth of the pinion; the ratio of the diameter of the fixed circle to the diameter of the pitch circle of the gear wheel being an aliquant fraction whose denominator is equal to the number of teeth of the gear wheel and whose numerator is at least two and not more than the number of teeth of the gear wheel minus 2. The rotation of the gear wheel has superimposed thereon a second rotation by an apparatus in which a fixed externally-toothed gear is mounted on the machine base; a driving portion of an eccentric shaft, having a driven portion whose axis is parallel to and spaced from the axis of the driving portion by a distance equal to the difference between the radius of the pitch circle of the gear wheel and the radius of the fixed circle, is rotatably mounted in the base; a support table, adapted to support the gear wheel concentrically with respect to the driven portion of the shaft, is rotatably mounted on the driven portion of the shaft and has an internally-toothed gear formed thereon circumferentially larger than the externally-toothed gear and spaced therefrom; and a gear means is disposed between the externally-toothed gear and the internally-toothed gear and is adapted to mutually mesh with these gears. Preferably, the externally-toothed gear, the gear means and the internally-toothed gear mesh in a common plane. It is also preferred that the gear means is a pair of mutually meshing gears which individually mesh with the externally-toothed gear and the internally-toothed gear. Finally, the gear means is preferably mounted in a fashion such that it may be adjusted to accommodate different spacings between the externally-toothed gear and the internally-toothed gear.

40 Claims, 24 Drawing Figures

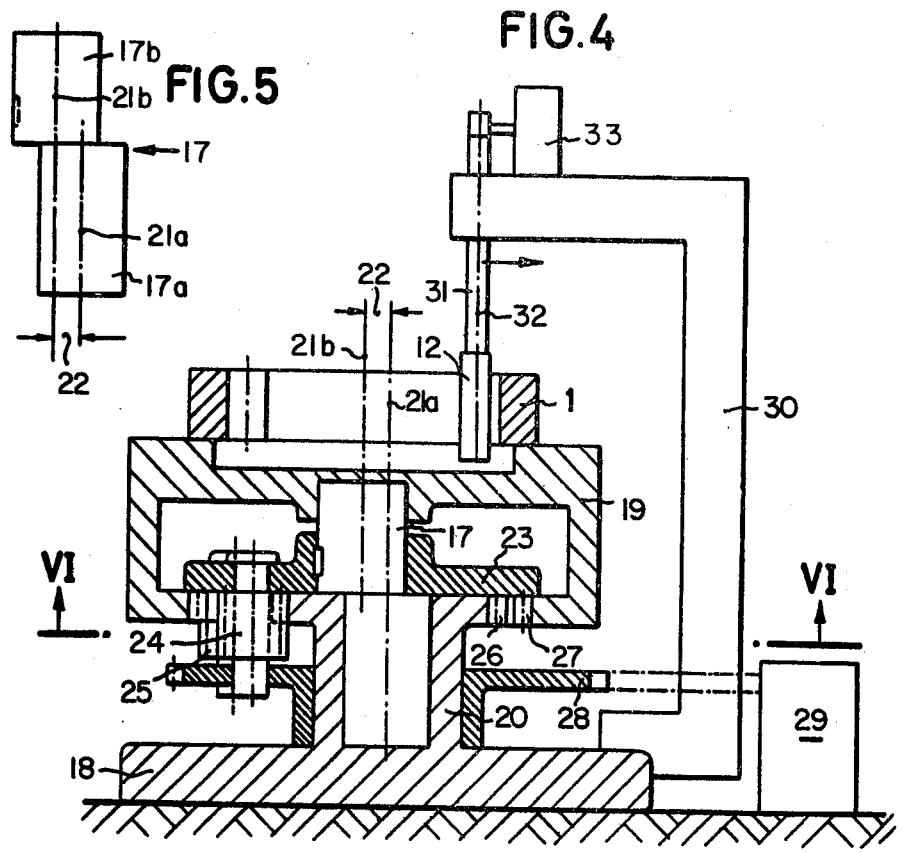
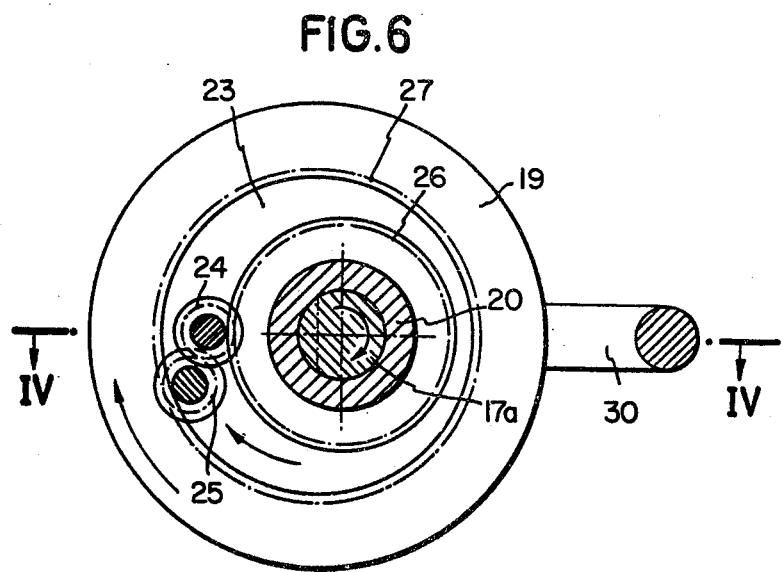

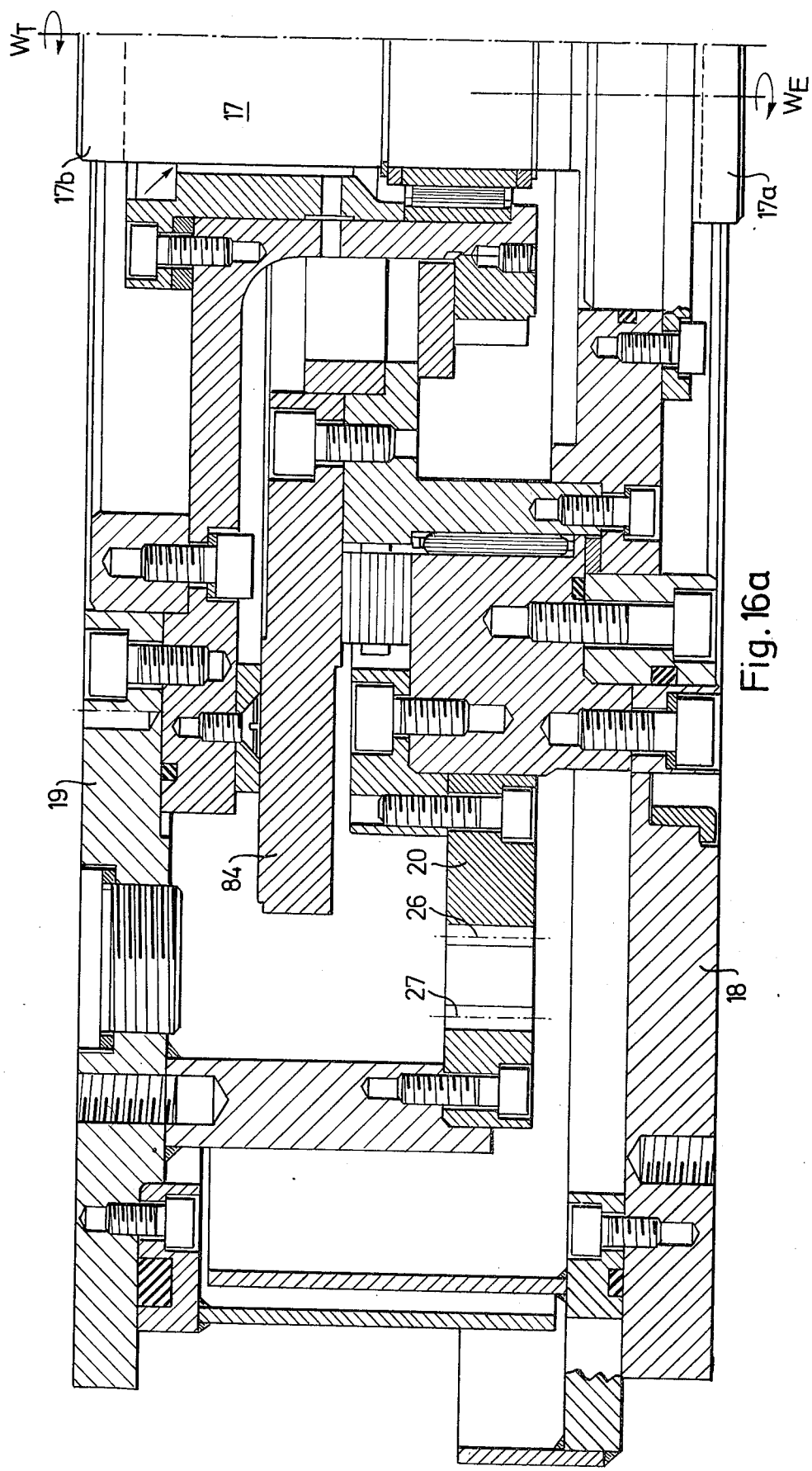

METHOD AND APPARATUS FOR GRINDING THE TOOTH FLANKS OF INTERNALLY-TOOTHED GEAR WHEELS

The present application is a Continuation-in-Part of copending Application Ser. No. 173,110, filed by Hermann Harle and Siegfried Eisenmann on Aug. 19, 1971 and entitled "GEAR MACHINE", now U.S. Pat. No. 3,782,040, which application is incorporated herein by reference.

The present invention relates to a method and apparatus for grinding the teeth of annular, internally-toothed gear wheels. More particularly, the present invention relates to a method and apparatus for grinding the teeth of annular, internally-toothed gear wheels in which the pitch circle of a roughed-out, annular gear wheel is rotated so as to roll off or hob on a smaller stationary or fixed circle disposed inside the annular gear wheel.

Annular, internally-toothed gear wheels meshing with an externally-toothed pinion are utilized in a number of applications, such as, gear transmissions for changing speed or torque and hydrostatic or volumetric gear pumps or motors. In the latter type of apparatus, the gearing functions as a pump when driven and as a motor when fluid is supplied under pressure.

A major difficulty arising in the production of such gear machines lies in the production of the teeth of both the internal and the external gears with any degree of precision and so that they will properly mesh with one another. Such gear teeth can be produced by shaping, by the generating process (i.e. the gear to be cut and the cutter rolling against one another or relative to one another) or by milling. The difficulty with these techniques is that the gears cannot be hardened if any degree of precision is also required.

If the two gears are hardened, they tend to distort, particularly the internally-toothed gear wheel, and considerable clearances must be provided even if, after hardening, the profiles and the crests of the teeth are ground. While the tooth flanks can also be ground by the use of a dividing head, in which each tooth gap is finish ground before the machine is indexed a distance equal to the pitch of a tooth and the next tooth is ground, this technique cannot achieve a high degree of precision. Moreover, the method also is time-consuming and is not suitable for large out-puts. If the internal gear is ground in this way, the inner gear wheel or pinion can be ground by the generating roll process, provided an involute tooth flank is chosen. Nevertheless, the production problem with respect to the more difficult member of the pair, namely; the internal gear, still remains unresolved. It is important in this instance to note that the internal gear requires an even higher degree of precision than the external gear because, during hardening, this gear distorts far more than the smaller and more compact external gear due to the annular shape of the internal gear.

A method and apparatus for grinding annular, internally-toothed wheels has been suggested in U.S. Pat. No. 2,665,612. In accordance with this patent, a fixed, externally-toothed sun gear is mounted on a horizontally-disposed frame. Rotatably passing through the frame is a driving portion of an eccentric shaft which is concentric with the stationary sun gear. A projection is formed on one side of the driving portion of the eccentric shaft which carries a rotatable shaft. Mounted on one end of this rotatable shaft is a planetary gear which meshes with the fixed sun gear. Rotatably mounted on the free or driven portion of the eccentric shaft is an externally-toothed gear, which meshes with a second planetary gear carried at the opposite end of the rotatable shaft mounted on the projection. Thus, as the driving portion of the offset shaft is rotated, it carries the two planetary gears thereabout and, as a result, the stationary sun gear rotates both planetary gears. The rotation of the second planetary gear, in turn, causes rotation of the rotatable sun gear. Attached adjacent one side of the rotatable sun gear is a chuck adapted to hold a roughed-out annular, internally-toothed gear wheel. Disposed adjacent the end of the device carrying the annular gear wheel blank is a flat cutting wheel which is rotated on an axis perpendicular to the axes of the eccentric shaft and which is reciprocated parallel to said axes to move the cutting wheel into and out of the roughed-out, internally-toothed gear wheel to thereby cut the teeth in the annular gear wheel as the annual gear wheel is rotated by the previously described mechanism. Aside from the longitudinal movement and the rotation of the cutting wheel itself, the cutting device makes no other movements. Thus, as the cutting wheel is moved into and out of the roughed-out gear wheel, the gear wheel is executing the same movements with relation to the cutting wheel as it would with relation to the pinion or externally-toothed gear wheel with which it will be used. The circumferential profile of the cutting wheel corresponds exactly to the profile of the tooth to be cut in the annular gear wheel. The depth of the cut of the cutter is varied by conventional transverse displacement.

While, in principle, it is possible to build a device for producing annular, internally-toothed gear wheels in accordance with U.S. Pat. No. 2,665,612, of sufficient size to accommodate the eccentricities and gear ratios generally desired, a mathematical analysis of this device has been made and the following problems have been found to exist:

1. In the ordinary normal case, no standardized module can be used for the control wheels (stationary sun gear, rotary sun gear and planetary gears). Instead, the module must be calculated according to a specific equation in which the number of teeth and the distance between axes of the eccentric shaft are factors.

2. As is obvious from the patent, only one size gear can be made. If, on the other hand, one wishes to move the axis of the planet gears away from the driven portion of the eccentric shaft, the module becomes increasingly smaller despite the fact that the sun gears and/or the planetary gears are larger. In addition, this is uneconomical.

3. The further the axis of the planet gears is moved away from the axis of the driving portion of the offset shaft, the planet gears approach in diameter the sun gears. However, a machine constructed in this manner becomes very unwieldy and has unusable dimensions or measurements.

4. The fact that the planetary gears are positioned on one side of the driven portion of the eccentric shaft causes an unbalancing of the entire machine. As a result, the desired accuracy of machining the annular gear is endangered. This is further aggravated if one wishes to move the axis of the planetary gears further from the axis of the driven portion of the offset shaft.

5. Because of the extreme one-sidedness of the machine, due to the placement of the planetary gears, the entire machine is unbalanced causing a one-sided load on the eccentric shaft and thus causing the entire engine to wobble. As a result, counter-weight is required which, in turn, results in extremely heavy and unwieldy construction.

6. The control wheels of the device (stationary and rotary sun gears and planetary gears) are not exchangeable because the module must be determined and established for each individual eccentricity and each transmission ratio.

Further, it has also been found in actual practice that an eccentric shaft of the type used in U.S. Pat. No. 2,665,612 cannot be made with sufficient accuracy. This is primarily because of the positioning of the shaft carrying the planet gears and the necessity that this shaft be long which, in turn, makes it necessary that the eccentric shaft be long. In fact, it is almost impossible in actual practice for the alignment of the driving portion of the eccentric shaft and the free portion of the eccentric shaft to be free of alignment errors. By way of contrast, the method and apparatus of the present invention have the following advantages.

1. It is possible, in accordance with the present invention, to produce a gear system of any desired size, even in a case where the wheel set has a very small eccentricity.

2. The gear tooth combination for the gear system to be produced may be freely chosen.

3. The control gears of the drive system of the machine or engine are in a single plane so that the engine becomes extremely flat in construction.

4. Because of the ability of the present invention to utilize the same module, the gear wheels of the drive system may be combined in any desired manner (for example, the large, hollow, internally-toothed wheel can be built into the machine and the externally-toothed wheel can be exchangeable) by utilizing the hereinafter-mentioned means for replacing or displacing the planet wheels, and the gears of the system will mesh properly and be free from play.

5. In a preferred form of the apparatus of the present invention, the work table can be positioned on plates and rings which can be precisely ground in a horizontal plane. As a result, any wobbling of the table is completely eliminated.

6. The eccentric shaft, in a preferred embodiment, serves only to provide for the radial throw of the working table and, with the planetary gears positioned thereon, for the meshing of the teeth of the gears of the drive system.

Summarily, the present invention comprises a method for grinding the tooth flanks of a roughed-out annular, internally-toothed gear wheel wherein the pitch circle of the internally-toothed gear wheel is rotated about or rolled off a fixed circle having a diameter equal to the pitch circle of an externally-toothed pinion, adapted to mesh with the finished internally-toothed gear wheel; and, simultaneously with the rotation of the gear wheel, a grinding wheel is rotated on an axis parallel to the plane of the gear wheel, is reciprocated through the interior of the gear wheel along an axis parallel to the axes of the pitch circle of the gear wheel and the fixed circle, and maintained a fixed distance from the axis of the fixed circle, except for normal infeed, and has a circumferentially-disposed grinding surface whose cross-sectional profile is equivalent to the profile of at least a part of the profile of at least one tooth of the pinion; the ratio of the diameter of the fixed circle to the diameter of the pitch circle of the gear wheel being an aliquant fraction whose denominator is equal to the number of teeth of the gear wheel and whose numerator is at least two and not more than the number of teeth of the gear wheel minus 2. Preferably, the gear wheel is rotated on an axis offset from the axis of the fixed circle by a distance equal to the difference between the radius of the pitch circle of the gear wheel and the radius of the fixed circle at a predetermined speed, a second rotation about the axis of the fixed circle is superimposed on the rotation of the gear wheel and the ratio of the speed of rotation of the gear wheel to the speed of the superimposed rotation is equal to the ratio of the difference between the radius of the pitch circle of the gear wheel and the radius of the fixed circle to the radius of the pitch circle of the gear wheel. The specified ratio of the diameter of the fixed circle to the diameter of the pitch circle of the gear wheel need not be adhered to and the resulting fraction can be an aliquot fraction (having a common divisor for the numerator and denominator) if the grinding wheel's circumferentially-disposed grinding surface has a profile equivalent to the profile of at least two teeth of the pinion. The rotation of the gear wheel has super-imposed thereon a second rotation by an apparatus in which a fixed externally-toothed gear is mounted on the machine base; a driving portion of an eccentric shaft, having a driven portion whose axis is parallel to and spaced from the axis of the driving portion by a distance equal to the difference between the radius of the pitch circle of the gear wheel and the radius of the fixed circle, is rotatably mounted in the base; a support table, adapted to support the gear wheel concentrically with respect to the driven portion of the shaft, is rotatably mounted on the driven portion of the shaft and has an internally-toothed gear formed thereon circumferentially larger than the externally-toothed gear and spaced therefrom and a gear means is disposed between the externally-toothed gear and the internally-toothed gear and is adapted to mutually mesh with these gears. Preferably, the externally-toothed gear, the gear means and the internally-toothed gear mesh in a common plane. It is also preferred that the gear means is a pair of mutually meshing gears which individually mesh with the externally-toothed gear and the internally-toothed gear. Finally, the gear means is preferably mounted in a fashion such that it may be adjusted to accommodate different spacings between the externally-toothed gear and the internally-toothed gear.

The objects and advantages of the present invention will be apparent from the following detailed description when read with relation to the teachings of copending Application Ser. No. 173,110 and the accompanying drawings wherein.

Figure 3:
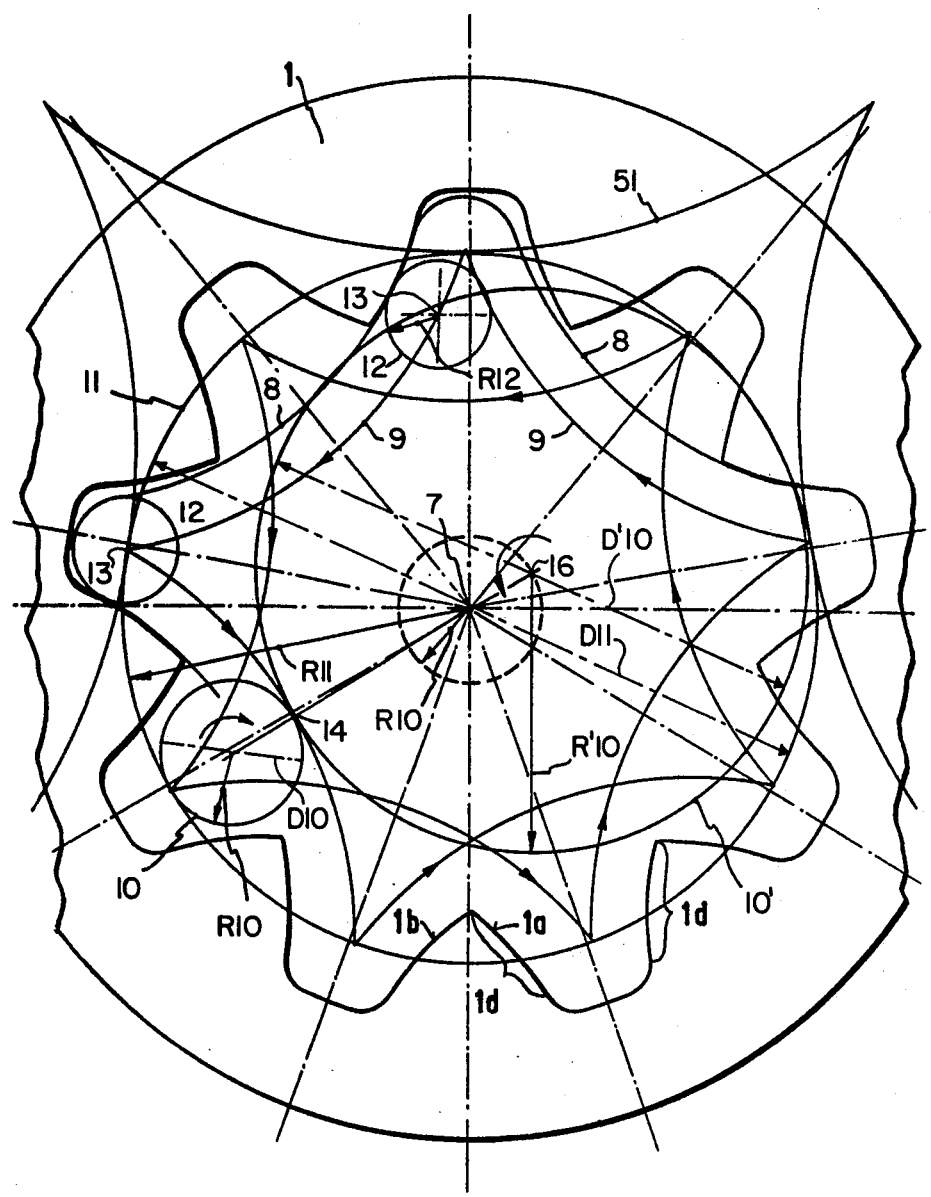
Figure 7:
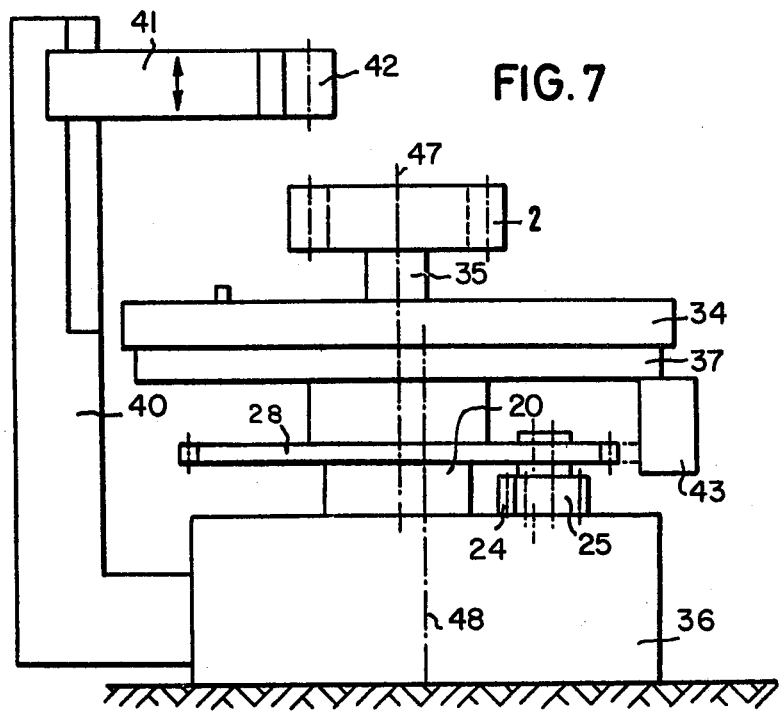
Figure 9:
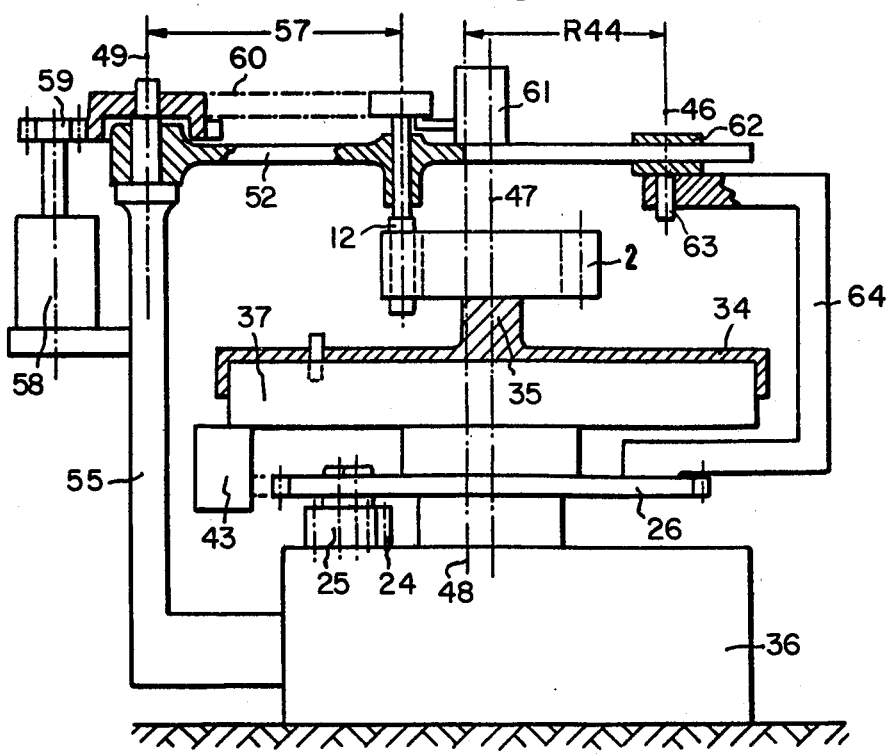
Figure 8:
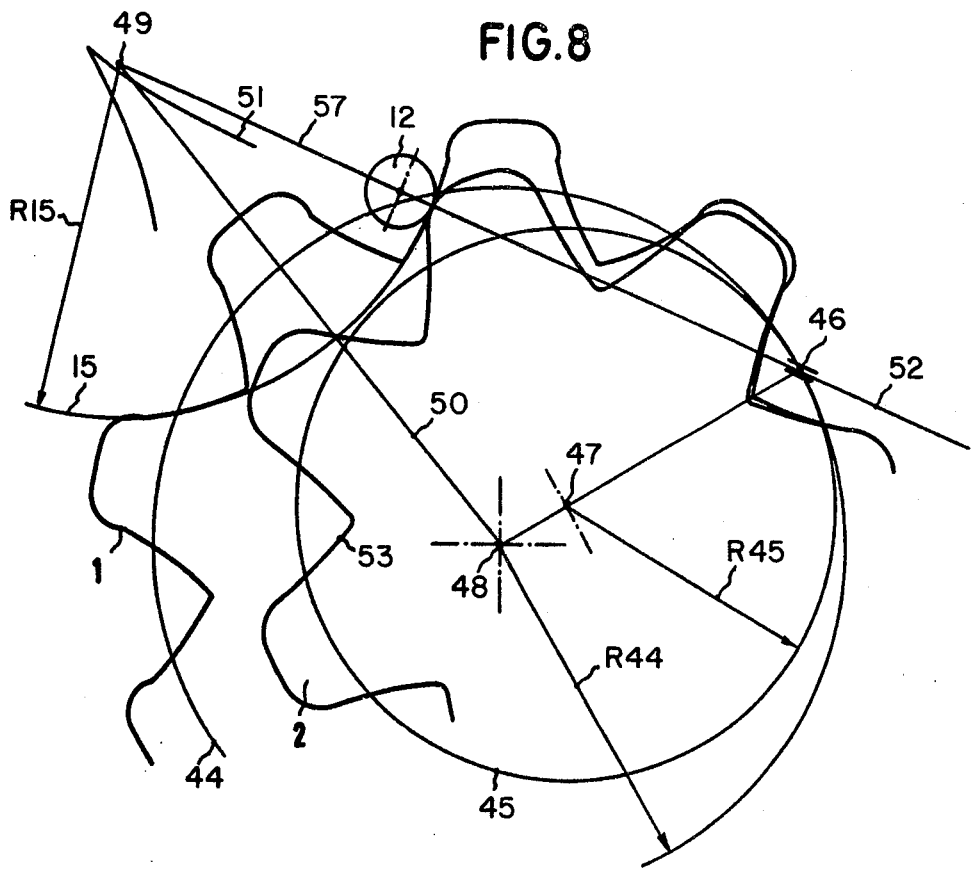
Figure 8A:
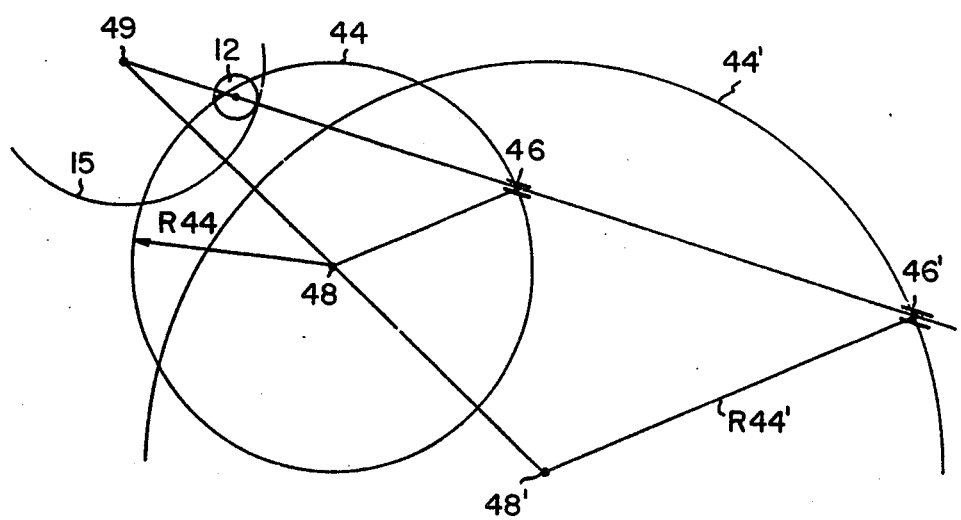
Figure 10:
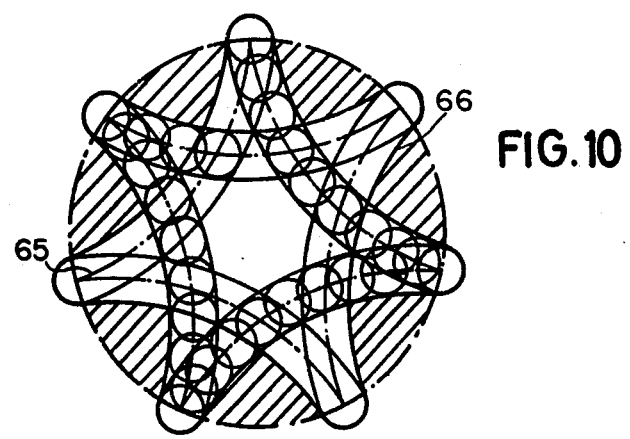
Figure 11:
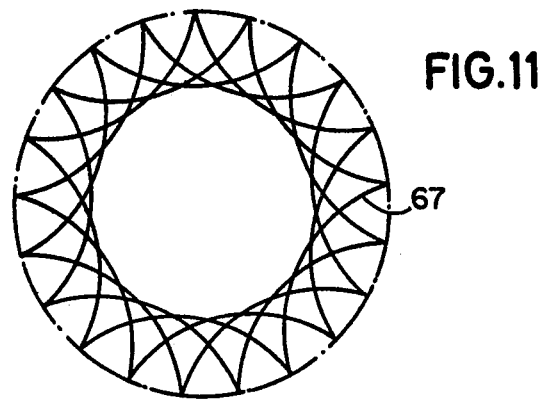
Figure 12:
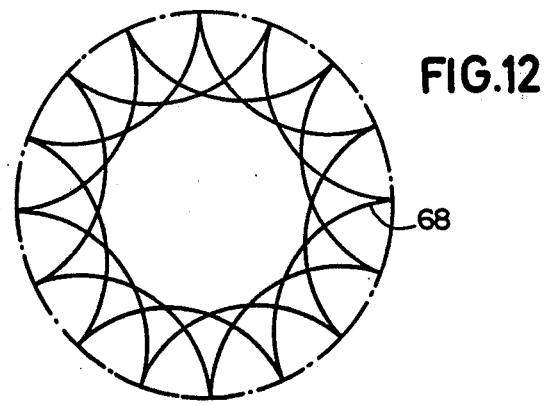
Figure 13:
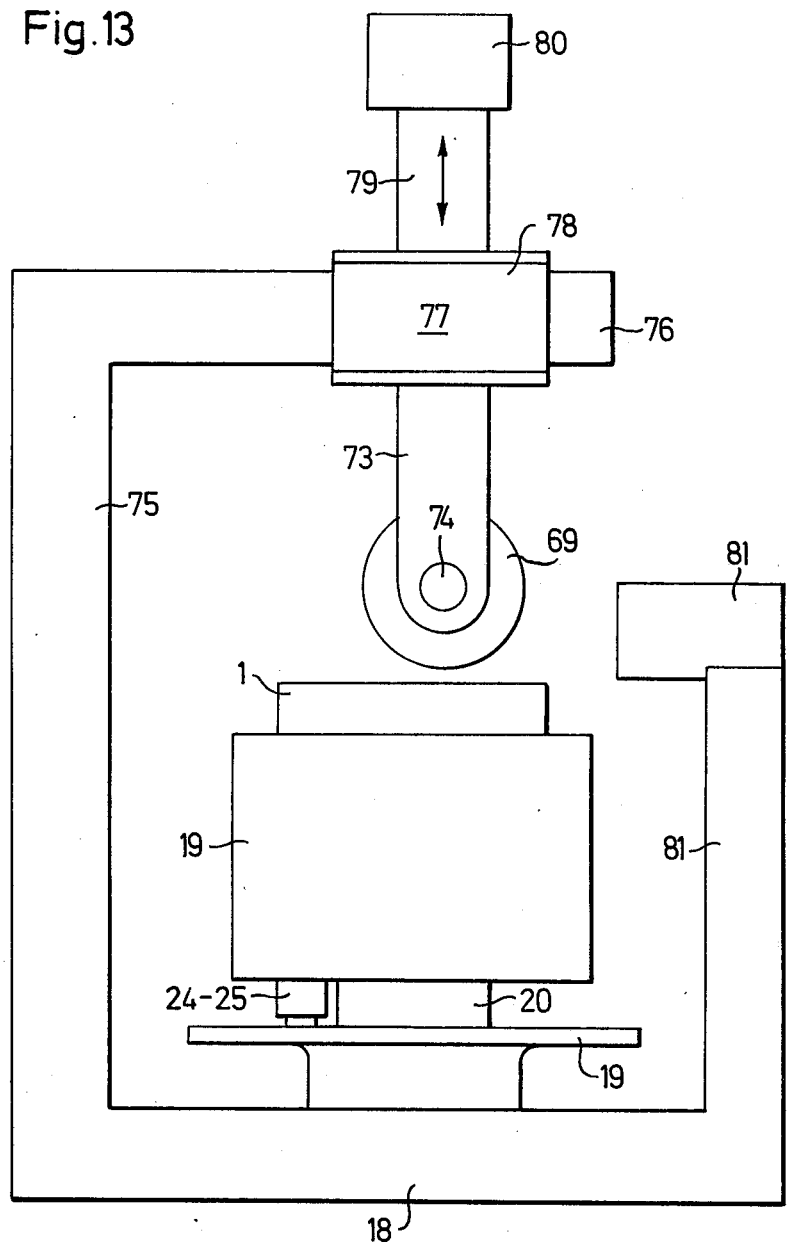
Figure 14:
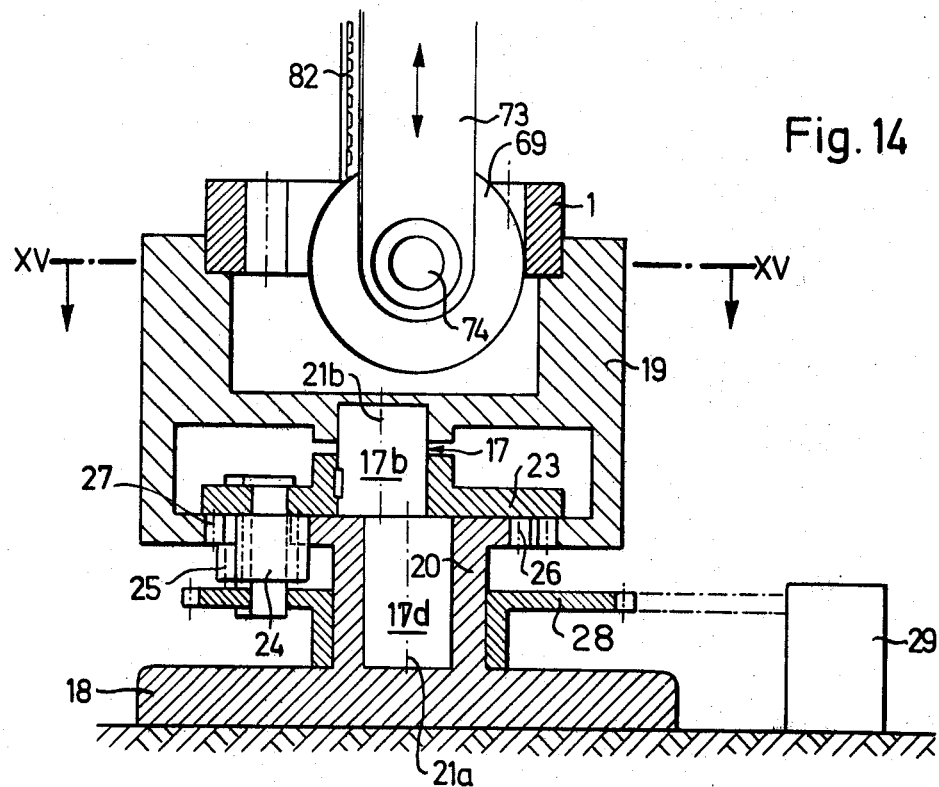
Figure 15:
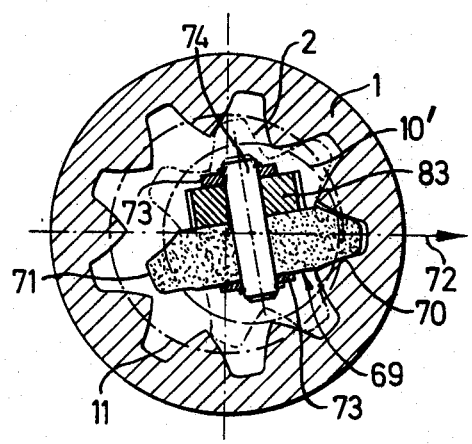
Figure 16B:
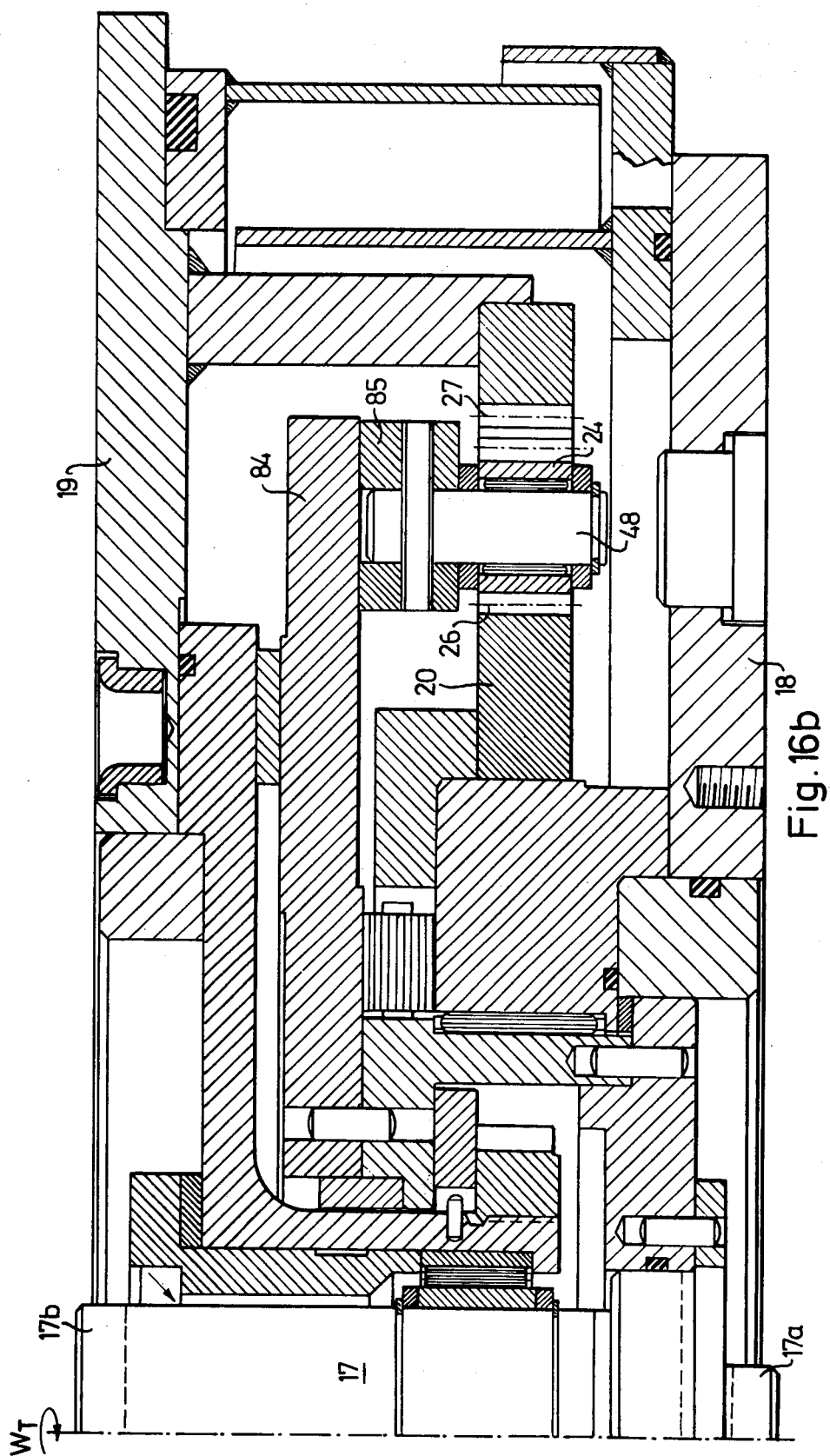
Figure 17:
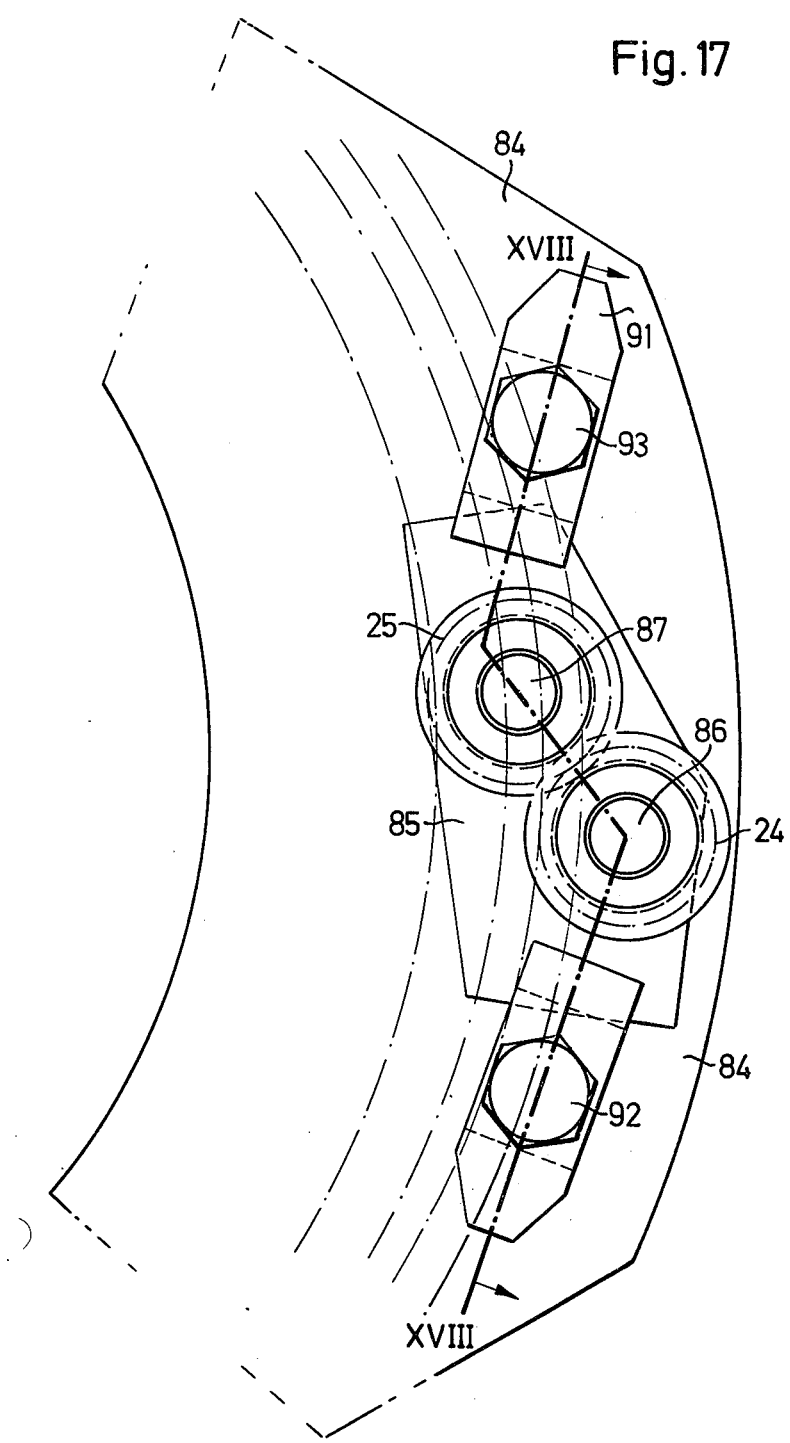
Figure 18:
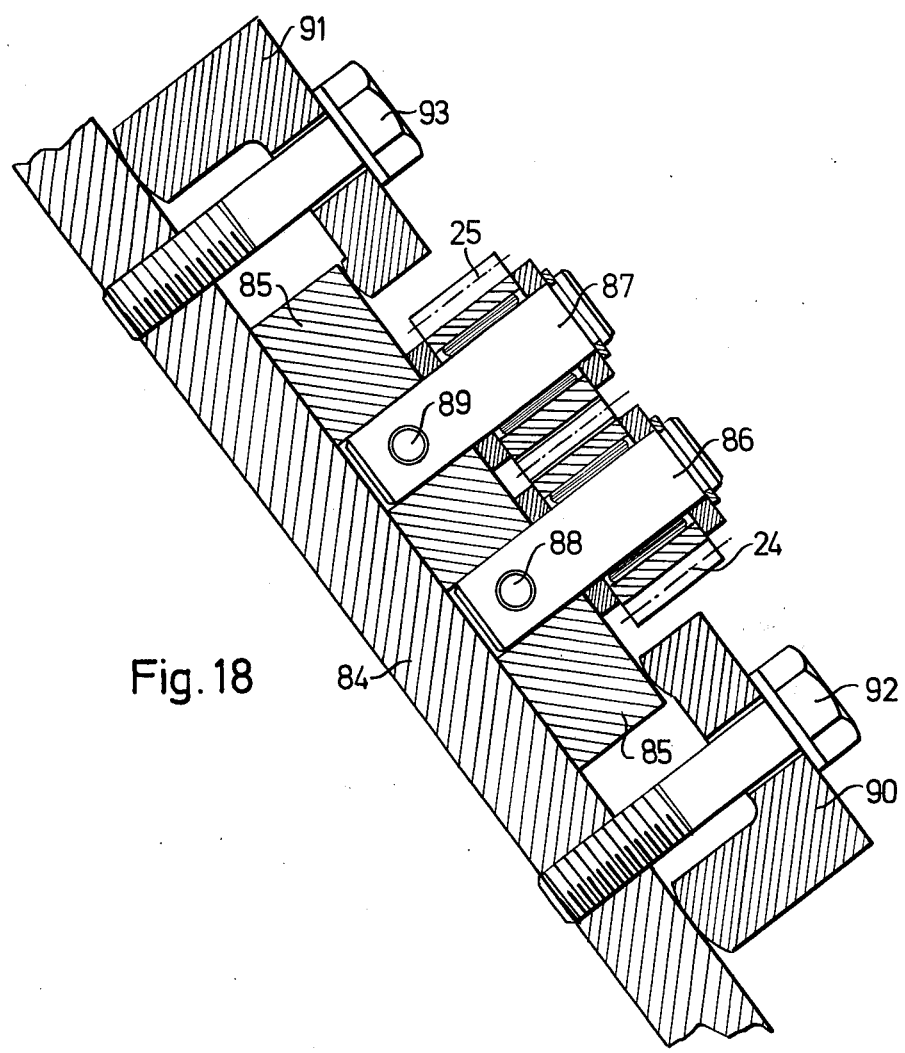
Figure 19:
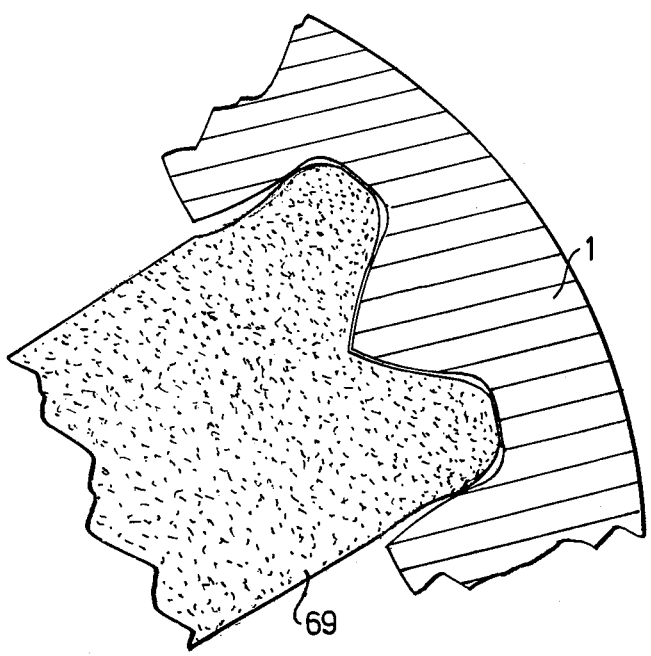
Figure 20:
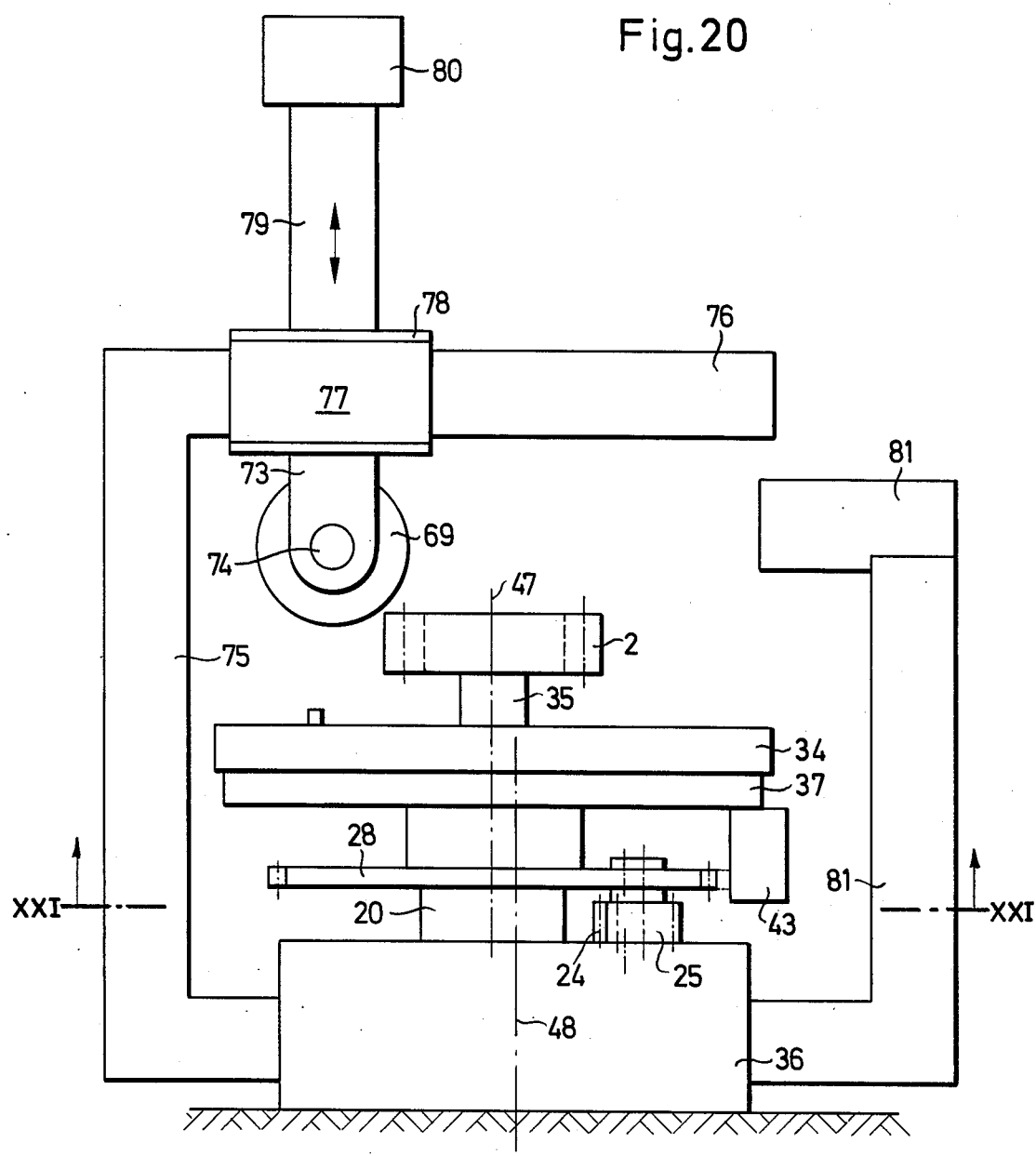
Figure 21:
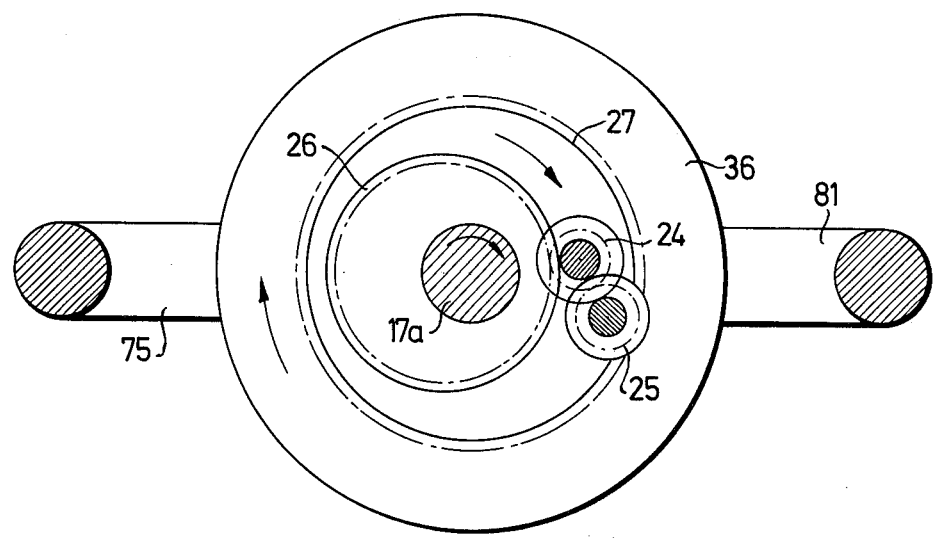
Figure 22:
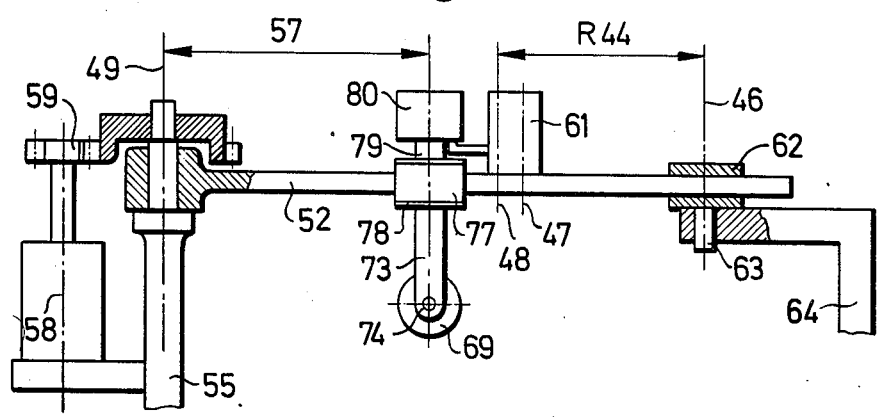

FIG. 3 illustrates the geometrical relationships existing in an annular, internally-toothed gear wheel according to the invention, FIG. 4 is a schematic representation of an apparatus for grinding an outer wheel according to Application Ser. No. 173,110, FIG. 5 is the eccentric shaft of the apparatus of FIG. 4, FIG. 6 is a section taken on the line VI—VI of FIG. 4, FIG. 7 is a schematic representation of an apparatus for shaping the flanks of a pinion according to Application Ser. No. 173,110, FIG. 8 is a schematic drawing illustrating the geometrical relationships that exist when grinding an annular, internally-toothed gear wheel according to Application Ser. No. 173,110, with the aid of a grinding spindle that is movable along an arc of a circle, FIG. 8a is a schematic representation of the geometrical relationships applying to a modified form of the principle underlying FIG. 8, shown on a small scale than FIG. 8, FIG. 9 is a schematic representation of an apparatus for grinding the flanks of an annular, internally-toothed gear wheel according to FIG. 8, FIG. 10 illustrates a cycloid which closes upon itself after two revolutions as well as the corresponding equidistant curve for the generation of the teeth of an annular, internally-toothed gear wheel having seven teeth, FIG. 11 illustrates a case of a greater number of teeth, i.e. 21 teeth, FIG. 12 is an example of an annular, internally-toothed gear wheel having sixteen teeth in which the generating point on the rolling circle returns to its starting position after three complete revolutions around the base circle, FIG. 13 illustrates schematically an apparatus for carrying out the method of the present invention, FIG. 14 is a vertical, cross-sectional view through the central lower portion of the apparatus of the present invention, FIG. 15 is a cross-sectional view taken along the line XV — XV of FIG. 14, FIG. 16 is a vertical, cross-sectional view through the central portion of the drive mechanism of a modified form of the apparatus of the present invention, FIG. 17 is a bottom view of the planetary gears of FIG. 16, FIG. 18 is a cross-sectional view taken along the line XVIII— XVIII of FIG. 17, FIG. 19 is a cross-sectional view of a modified grinding wheel for use in the present invention, FIG. 20 is a schematic representation of an apparatus for shaping the flanks of a pinion according to the present invention, FIG. 21 is a section taken on the line XXI — XXI of FIG. 20, and FIG. 22 is a schematic represenation of a modified grinding means for the apparatus of FIG. 20.

It is to be noted that the following description of the apparatus and the drawings have been simplified considerably to facilitate an understanding of the basic principles applicable to the invention.

When utilized herein, the terms "rolling circle" or "pitch circle" are meant to have their customary meaning in the toothed gear system art, as explained and illustrated in "Die Zahnformen der Zahnraeder" ("The Tooth Shapes of Gear Wheels"), by H. Trier, Springer-verlag, Berlin Goettingen, Heidelberg, 1949.

Figure 1:
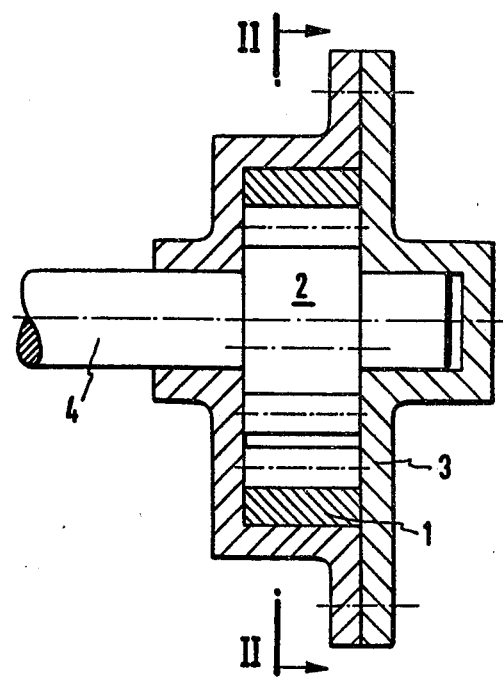
FIG. 1 is a schematic representation of a gear machine in a section through the axes of the pinion and the annular, internally-toothed gear wheel.
Figure 2:
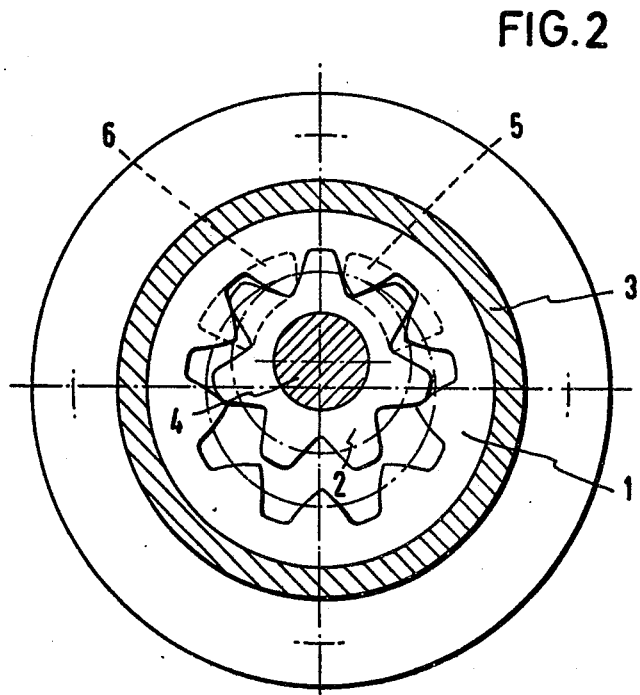
FIG. 2 is a section taken on the line II — II of FIG. 1.

The gear machine illustrated in FIGS. 1 and 2 has a divided casing 3 in which an annular, internally-toothed gear wheel 1 is rotatably mounted. An externally-toothed pinion 2 is secured on a shaft 4 which extends through two bearing bushings in the casing 3. If, in this arrangement, entry openings 5 and 6 are provided, as indicated in FIG. 2, and the pinion is driven, then the machine will function as a gear pump. Alternatively, if a pressure medium is introduced through one of the openings, the machine will run as a motor, shaft 4 thus being the output shaft. If the casing 3 is mounted in bearings, not shown, so that it is rotatable about an axis concentric with the shaft 4 and the casing 3 is driven, then the arrangement can be used as a reduction gearing having a substantial reduction ratio. Gear transmissions, pumps and motors of the described kind are well known in the art.

As previously explained, the basic problem in such machines is that of satisfactorily producing precisely worked and, preferably, hardened gear teeth.

Basically the method and apparatus of Applicaton 173,110 solves the problems of providing a pair of gear wheels for a gear machine, comprising an annular, internally-toothed gear wheel which meshes with an externally-toothed pinion, in which the tooth flanks of the gear wheel, and preferably also of the pinion, are hardened and ground by the generating roll process.

Because of the small degree of distortion of the pinion and the greater ease of compensating for errors in pitch and geometry, grinding, and possibly even hardening, of the pinion can sometimes be dispensed with. Moreover, the pinion can be ground with the aid of a dividing head more easily and with fewer errors. If a sufficiently hard steel is used for the pinion, it can also be shaped and shaved. Its higher wear compared with the annular gear wheel can be more readily accepted because the pinion, when not hardened but merely shaped or milled, is fairly easy to produce and hence is replaceable at less expense. Nevertheless, it is preferred that the opinion should also be hardened and ground. In a case where more exacting requirements relating to precision and life of the inner wheel apply, hardening is an unavoidable necessity.

For solving the above-described problems, the method and apparatus of Application Ser. No. 173,110 proceeds from the basic thought that the teeth of the annular gear wheel 1 should have a tooth flank profile that can be ground by the generating roll process. The teeth of the pinion 2 can then be finish machined in a machine simulating the rolling of the pinion 2 in the annular gear wheel 1, by shaping or milling, but preferably by grinding. The preferred material of the annular gear wheel and the pinion is steel.

The basic principles involved can best be explained by reference to FIG. 3. In the gear machine proposed, the gear flanks of the annular gear wheel 1, viewed in a sectional plane normal to the gear wheel axis 7, at least in the upper half of the height of the tooth and preferably in the upper four-fifths, are defined by an equidistant curve 8 from a hypocycloid 9 or two like hypocycloids as will be explained later. The diameter $D_{10}$ of the rolling circle 10 generating the cycloid 9 (or cycloids) by rolling on a base circle 11, concentric about the axis 7 of the annular gear wheel 1, is a fraction of the base circle diameter $D_{11}$. The numerator and denominator of this fraction are integers, the denominator of the fraction equals the number of teeth of the annular gear wheel 1, when the numerator of the fraction equals or is greater than two, the numerator and denominator of the fraction have no common submultiple (an aliquant fraction). The equidistant curve 8 is radically outside the cycloid 9 (or cycloids), the annular gear wheel is hardened (the expression "hardened" is here intended to embrace not only materials that have been hardened by an appoprriate treatment but also materials that, by nature, are so hard that they cannot be machined otherwise than by grinding), the tooth flanks of the annular gear wheel 1 are at least and preferably ground in the zones defined by the equidistant curve 8, and the tooth profile of the pinion 2 in the region of mesh is at least approximately defined by the rolling of the pinion 1 in the annular gear wheel 1.

It can be shown by mathematical calculation that two rolling circles 10 and 10′, having diameters $D_{10}$ and $D'_{10}$ whose sum is equal to the diameter $D_{11}$ of the base circle 11, generate the same cycloid. The tooth flanks are defined by equidistant curves from two like hypocycloids, displaced from one another by a small angle when it is desired to grind all of the left- or right-hand tooth flanks first and then all of the other flanks. However, definition by one equidistant curve is preferable when the ratio of the diameter $D_{10}$ of the rolling circle 10 to the diameter $D_{11}$ of the base circle 11 is $1/n$ or $(n-1)/n$ ($n$ being an integer). A curve of equal distance or an equidistant curve 8 from a hypocycloid 9 is here understood to be the envelope curve of all circles 12 of like diameter having their central axis 13 on the hypocycloid 9.

The generation of the tooth flanks by an equidistant curve 8 from a hypocycloid 9 enables the precise desired tooth shape to be ground in apparatus in which a grinding wheel, having a diameter equal to circle 12, moves along a hypocycloidal path 9 in relation to the annular gear wheel 1 and the radius $R_{12}$ of the element is equal to the distance of the equidistant curve 8 from the hypocycloid 9.

The point 14 on the rolling circle 10 generating the hypocycloid 9 (or hypocycloids) is preferably located on the circumference of the rolling circle 12.

In order to avoid unfavorable proportions, the tooth height of the annular gear wheel 1, measured from the base circle 11, should preferably be less than 30 per cent of the radius $R_{11}$ of the base circle 11. In a still more preferred embodiment, the height of the teeth of the annular gear wheel 1 from the base circle 11 should be less than 25 per cent but greater than 5 per cent of the radius $R_{11}$ of the base circle 11.

When all of the left- or right-hand tooth flanks are to be ground first and then all of the other flanks, the distance of the equidistant curve 8 from the cycloid 9 preferably should be slightly less (preferably 5 to 20 per cent, specifically about 10 per cent less) than half the linear distance between the ground zones of facing flanks of neighboring teeth of the annular gear wheel 1 where these zones are closest together.

Application Ser. No. 173,110 also relates to a method of grinding the preformed blank of an annular, internally-toothed gear wheel 1 for a gear machine.

This method consists of rotating the annular gear wheel 1 about its axis 7 at a predetermined speed, superimposing upon this rotation about the axis 7 of the annular gear wheel 1 a second rotation about a second axis 16 which is parallel to the axis 7 of the annular gear wheel 1 and located at a distance therefore equal to the radius $R_{11}$ of the base circle 11 minus the radius $R_{10}$ of the rolling circle 10, the ratio of the speed of rotation of the annular gear wheel 1 about its axis 7 to the speed of the superimposed rotation being equal to the ratio of the radius $R_{11}$ of the base circle 11 minus the radius $R_{10}$ of the rolling circle 10 to the radius $R_{11}$ of the base circle 11 of the cycloid 9. Both rotations proceed in the same direction, if the rolling circle 10 is the smaller of the two possible rolling circles 10 and 10′, and in the contrary directions, if the rolling circle 10′ is the greater of the circles 10 and 10′. Consequently, the axis 13 of the grinding cylinder 12, which runs parallel to the second eccentric axis 16, is moved perpendicularly to its axis only for the purpose of infeeding the grinding cylinder 12 as material is removed from the interior of the annular gear wheel 1. This infeeding motion is in a direction away from the second axis 16. By proceeding in this way, the grinding cylinder 12 is conducted, in relation to the annular gear wheel blank 1, in such a way that the circumference of the grinding cylinder 12 defines the desired equidistant curve 8 of the hypocycloid 9.

Conveniently, the rotating grinding cylinder 12 is reciprocated in its axial direction during grinding, as is conventional.

If it is desired to generate an annular gear wheel 1, in which each equidistant curve 8 from the arc of the cycloid 9 makes contact with only one tooth flank (cyclodial arc is here understood to be the arc of a hypocycloid 9 between two consecutive radial end points), i.e. in the event it is not desired that the grinding cylinder 12 grind two tooth flanks at the same time when its axis passes through the cusps of the cycloid 9 and appropriate clearance has not been machined into the annular gear wheel blank 1, then it is preferred, after finish grinding all the left-hand or right-hand flanks, returning the grinding cylinder 12 to its starting position and turning the annular gear wheel 1 about its axis 7, without rotation of the second axis 16, a sufficient distance in relation to the grinding cylinder 12 so that the latter now grinds the right-hand or left-hand tooth flanks, respectively.

Instead of turning the annular gear wheel blank 1, the grinding cylinder 12 could just as well be displaced a corresponding distance along a line normal to the center axis of the tooth gap in which the grinding cylinder 12 happens to be. Thus, shifting the grinding cylinder 12 is simpler than turning the annular gear wheel blank 1.

Application Ser. No. 173,110 also relates to a method of grinding the tooth flanks of a pinion 2 of the gear machine. This method comprises rotating the pinion 2 about its axis at a given speed, superimposing upon this speed abut this axis of the pinion 2 a second rotation at a different speed about a second axis extending parallel to the axis of the pinion 2 at a distance equal to the difference between the radii of the pitch circles of the annular gear wheel 1 and the pinion 2, the ratio of the speed of the pinion 2 about its axis to that of the superimposed rotation being equal to the ratio of the difference between the radii of the pitch circles of the annular gear wheel 1 and pinion 2 to the radius of the pitch circle of the pinion 2, both rotations being in contrary directions and the tooth flanks being machined during this motion by the generating roll process.

Application Ser. No. 173,110 also relates to apparatus for performing the above-described methods of producing both the annular gear wheel 1 and the pinion 2. In the apparatus for grinding the annular gear wheel 1, as illustated in FIGS. 4, 5 and 6, a driving portion 17a of two relatively eccentric parts of an eccentric shaft 17 is rotatably mounted in a baseplate 18 and the eccentricity of the two parts of the eccentric shaft 17 is equal to the difference between the radius $R_{11}$ of the base circle 11 and the radius $R_{10}$ of the rolling circle 10 of the cycloid 9. The free or driven portion 17b of the eccentric shaft 17 rotatably carries a table 19 to which the annular gear wheel blank 1 can be clamped and the eccentric shaft 17 and the rotatable table 19 are driven through a drive gear mechanism at different speeds. The ratio of the speed of rotation of the eccentric shaft 17 to the speed of rotation of the table 19, rotatably mounted on its eccentric part 17b, is equal to the ratio of the radius $R_{11}$ of the base circle 11 to the difference between the radius $R_{11}$ of the base circle 11 and the radius $R_{10}$ of the rolling circle 10 of the cycloid 9. A grinding means, which is fixed in relation to the baseplate 18, is provided, having a grinding cylinder 12 extending parallel to the axes of the eccentric shaft 17, is radially displaceable in relation to the bearing 20 of the eccentric shaft 17 in the baseplate 18.

It will be further understood from the drawing that this equidistant curve 8 does not contact both the relatively remote flanks 1a and 1b of two neighboring teeth of the annular gear wheel 1. It makes contact merely with the ring-hand flank 1b of one tooth (viewed from the center of the annular gear wheel 1) so that this flank will assume the exact shape of the equidistant curve 8. The grinding cylinder 12 clears the left-hand flanks 1a of the teeth. Consequently, the reactive forces acting on the grinding cylinder 12, during grinding, are reduced. Moreover, when the grinding cylinder 12 wears it can be in-fed towards the right-hand tooth flank. Another matter that will be understood from the drawing is that the annular gear wheel blank 1 has been rough machined before being ground and hardened in such a way that in the region outside the base circle 11, the grinding cylinder 12 will run clear. In this region, which is not ground, no contact occurs between the annular gear wheel 1 and the pinion 2. The teeth are therefore ground only in the region marked 1d.

The apparatus for grinding the pinion, in accordance with Application Ser. No. 173,110, comprises a baseplate 18, having a bearing bushing 20 in which the bottom driving portion 17a of the eccentric shaft 17 is rotatably mounted to rotate about axis 21a.

The eccentricity 22 between the two parts 17a and 17b of the eccentric shaft 17 equals the length of the radius $R_{11}$ of the base circle 11 less the length of the radius $R_{10}$ or $R'_{10}$ of the rolling circle 10 or 10', respectively. The axis 13 of a grinding cylinder 12 thus moves along a hypocycloid 9 in relation to the annular gear wheel 1 that is to be ground. Secured on the upper part 17b of the eccentric shaft 17 is a disc 23. This disc 23 carries two rotatable pinions or planetary gears 24 and 25. The two pinions 24 and 25 are not only in mutual mesh; the pinion 24, which is closer to the eccentric shaft 17, is also in mesh with a stationary sun gear 26 on the bearing bushing 20 of the baseplate 18, whereas the pinion 25 that is remote from the eccentric shaft 17, meshes with gear teeth 27 on a worktable 19. The worktable 19 is rotatably mounted on the driven portion 17b in FIG. 4 of the eccentric shaft 17. The gearing 27 is concentric about the driven portion 17b of the eccentric shaft 17.

The apparatus is driven through a gear wheel 28 which is rotatable about the bearing bushing 20 and drivable by a motor 29 as indicated in dot-dash lines. The shafts of the two pinions 24 and 25 project into this gear wheel 28 so that rotation of the gear wheel 28 causes part 17b of the eccentric shaft 17, that is offset with respect to the bearing 20, to rotate at the same speed as the gear wheel 28. The transmission ratio of the gear wheel 28 to the gear wheel 27 is selected so that the speed of the worktable 19 bears the same proportion to the speed of the eccentric shaft 17 as the diameter $D_{11}$ of the base circle 11 reduced by the diameter $D_{10}$ of the rolling circle 10 to the diameter $D_{11}$ of the base circle 11. The hands of rotation are identical. for the grinding spindle 31, which revolves about its axis 32 and which carries a cylindrical grinding cylinder 12. In the illustrated embodiment the grinding spindle 31 is not movable. It is driven by a motor 33. Naturally, in actual practice, the arrangement must be provided with means for moving the grinding spindle 31, in FIG. 4, along the plane of the paper from left to right in order to feed the grinding cylinder 12 to the work as material is removed. Moreover, in practice, the apparatus must be provided with means for reciprocating the grinding spindle 31 in oscillatory motion parallel to its axis 32 to generate exactly cylindrical tooth flanks.

The simplest method of generating a precise set of gear teeth in the pinion 2 will be described with reference to FIG. 7. This method is based on the fact that each point of the pinion 2, when correctly meshing with the annular gear wheel 1, likewise describes a hypocycloidal curve. The pitch circle of the pinion 2 is the base circle for the generation of this latter hypocycloid, which will hereinafter be referred to as the pinion cycloid of distinguish it from the cycloid 9 of the annular gear wheel 1, since the pitch circle of the pinion 2 rolls on the pitch circle of the annular gear wheel 1. The pitch circle of the pinion 2 is the rolling circle of pinion cycloid. In this context, it should be pointed out that the expression "pitch circle" is intended to be the rolling circle between cooperating gears. Since in the generation of a hypocycloid the term rolling circle is likewise employed, the present specification will confine itself to referring to the latter merely in connection with the generation of cycloids.

Based on the fact that, during the rolling motion of the pinion 2 in the annular gear wheel 1, every point on the pitch circle of the pinion 2 will generate a pinion cycloid, it is possible, for simulating the rolling motion of the pinion 2 in the annular gear wheel 1, to make use of apparatus which, in principle, is of the same construction as that illustated in FIGS. 4 to 6. However, in FIG. 7, this arrangement is shown in reverse, as it were. In other words, the baseplate 18 in FIG. 4 is provided with a supplementary cover plate 34, which carries support means 35 for clamping up the pinion 2. However, otherwise the arrangement is the same, although the transmission ratios and the eccentricity are different. In the apparatus according to FIG. 7, in which the table 19 of the apparatus according to FIG. 4 now forms the baseplate 36 and the baseplate 18 in the apparatus according to FIG. 4 is the table 37, the ratio of the speed of rotation of the eccentric shaft 17 about the axis 47 to the speed of rotation of the baseplate forming the table 37, about the axis 48 equals the ratio of the pitch circle radius of the pinion 2 to the difference between the pitch circle radii of the pinion 2 and the annular gear wheel 1. The eccentricity of the eccentric shaft 17 equals the difference between the pitch circle radii of the pinion 2 and the annular gear wheel 1. By now affixing to the table, here forming the base 36, a support 40 for a vertically reciprocating shaping tool drive 41 which carries a segment 42 of an annular gear wheel 1 as the tool, and by driving the apparatus from the motor 43 attached to the table 37 through drive means indicated in dotted lines, the pinion 2 will be made to perform the same rolling motion in relation to the segment 42 of the annular gear wheel 1 which the finished pinion 2 would perform in relation to the finished annular gear wheel 1. The shaper mechanism 41, fitted with the internal gear segment 42, can now machine the teeth of the pinion 2 in the usual and conventional manner.

The above-described method is independent of the number of teeth of the pinion 2. For instance, assuming that the pinion 2 has only two teeth, a form which may be of little interest in actual practice, the ratio of the pitch circle radius of the pinion 2 to the difference between the pitch circle radii of the annular gear wheel 1 and the pinion 2 would be −2/7, if the annular gear wheel 1 has 9 teeth. If the pinion 2 has 7 teeth, for example, a more usual arrangement in practice, the above ratio will be −7/2. The negative sign indicates that the directions of rotation of the eccentric shaft 17 and of the pinion 2 are contrary.

In the two assumed cases the eccentricities of the eccenric shaft 17 are likewise different. In the first case, the eccentricity is large because the difference between the pitch circle radii is large. In the second case with seven teeth it is small because the difference is also small.

There is, however, a limitation which must be considered. If the annular gear wheel segment 42 has only a few teeth, the ratio of the number of teeth of the pinion 2 to the number of teeth of the annular gear wheel 1 must have no common submultiple. Only when this is the case will all the teeth of the pinion 2 satisfactorily roll on the internal gear segment 42 since otherwise there is no certainty that each tooth of the annular gear wheel 1 will, in the course of consecutive revolutions, engage every tooth gap of the pinion 2. If this stated conditions is not fulfilled, the shaping tool 42 must compirse a sufficiently large segment of teeth of the same shape as the annular gear wheel 1. The number of teeth in this segment 42 must be sufficient for each gap between neighboring teeth of the pinion 2 to perform a complete rolling motion over at least one tooth of the shaping tool 42.

Although the above-described apparatus permits very accurate pinions 2 to be generated, it is still not possible to harden these pinions without runing the risk of distortion. In order to overcome this difficulty, the contonurs to which the tooth flanks of the pinion 2 are ground as arcs of circles 15.

The geometrical reasons that underlie this step are illustrated in FIG. 8. The drawing shows several of the teeth of the pinion 2 as well as the contours of part of the annular gear wheel 1. The latter has a pitch circle 44 having a radius $R_{44}$. The pitch circle 45 of the pinion 2 has the radius $R_{45}$. The momentary point of contact of the two pitch circles is at 46. The center 47 of the pinion 2 is always located on the line connecting the center 48 of the annular gear wheel 1 and this point of contact 46. The rolling motion of the pinion 2 in the annular gear wheel 1 can be readily simulated by mounting the pinion 2 on a table, as already described with reference to FIG. 7, which rotates about the center 47 of the pinion 2. This table is itself mounted on an eccenric shaft 50 which rotates about the center 48 of the annular gear wheel 1, assumed to be fixed. The ratio of the speed of rotation of the eccentric shaft about the center 48 of the imaginary annular wheel 1 to the speed of rotation of the table carrying the pinion 2 and rotating on the free or driven portion of the eccentric shaft about the center 47 of the pinion 2 equals the ratio of the number of teeth of the pinion 2 to the difference between the number of teeth of the annular gear wheel 1 and the pinion 2 or that of the pitch circle radius of the pinion 2 to the difference between the pitch circle radii of the annular gear wheel 1 and the pinion 2. The hands of rotation are opposite. Accordingly, as shown in FIG. 8, the two outermost tooth flanks of a group of teeth (which comprises two teeth in FIG. 8) which, in the annular gear wheel 1, are enveloped by an equidistant curve from at least one cycloid, are instead defined by a circular arc 15 which touches the equidistant curve near the tips of both teeth. The arc 15 must be so determined that throughout the region of the tooth flanks it is the same or a greater distance away from its center 49 than the equidistant curve defining the tooth flanks of the actual annular gear wheel 1. This arc 15 has the radius $R_{15}$. Its center 49 must clearly lie on the bisector 50 through the center 48 of the annular gear wheel 1 of the groups of teeth embraced by one cycloid arc. Moreover, the centers of the radii of curvature of the cycloid 9 defining the tooth flank of the actual annular gear wheel 1 are located on the involute 51 shown in FIG. 3. The involute 51 is the locus of all centers of curvature of the cycloid. Part of the involute 51 is shown in FIG. 8. Since, in a preferred emboidment, the grinding cylinder 12, which is conducted along the cycloid 9, first grinds only right-hand tooth flanks during a grinding cycle and then only left-hand tooth flanks, the cusp at the apex of the involutes 51 in FIG. 8 is not suitable as a center for the radius of curvature of the approximating circle 15. The center 49 must be a point in proximity with the intercept of the involutes 51 and the straight line 50. A center 49 for the approximating circle 15 can thus be found.

Another simple and better way of finding the center of this approximating circle 15 is to draw the tooth form of the annular grear wheel 1 on a much enlarged scale, inserting the bisector 50 through the center 48 of a group of teeth of the annular gear wheel 1 embraced by one arc 15 of the cycloid and then finding the suitable radius $R_{15}$ by trial and error using a pair of dividers. This course will be adopted when, as is also possible, the equidistant curve 8 from the hypocycloid 9 defining the tooth profile of the annular gear wheel 1 touches two relatively remote tooth flanks of the end teeth of the group embraced by the cycloid arc 15. At least in the region of the upper havles of the teeth of the imaginary annular gear wheel 1, the distance of the circular arc 15 from the equidistant curve 8 must be as small as possible.

The tooth flanks of the gear 1 are thus replaced by a grinding cylinder 12 (FIG. 8) which pivots about the center 49 of an equivalent circle 15, the grinding cylinder 12 pivoting in such a way that the envelope curve of all positions of the grinding cylinder 12 is the circle 15. The line through the axis of the grinding cylinder 12 to the center 49 of the circle 15 is marked 52.

By ensuring that 52 always passes through the osculating point of the two pitch circles 45 and 44, and this can be done with the aid of guide means by rotating a rod representing the line 52 about the center of the non-eccentric or driving portion of the ecdentric shaft (i.e. about the center 48 of the pitch circle 44 of the annular gear wheel 1) at the same speed at which the eccentric shaft rotates, the grinding cylinder 12 can be made to machine the teeth of the pinion 2 for as long as the latter is in mesh with the equivalent tooth contour of the annular gear wheel 1 represented by the circle 15.

Since, when the ratio of the number of teeth of the pinion 2 to that of the annular gear wheel 1 is not equal to the ratio of the diameter $D_{10}$ of the rolling circle 10 of the cycloid 9 determining the shape of the teeth of the annular gear wheel 1 to the diameter $D_{11}$ of the relative base circle 11, the grinding cylinder 12 may machine the teeth of the pinion 2 only when it is in the region of a tooth flank of the annular gear wheel 1 and not when it traverses the gap between two teeth of the annular gear wheel 1, the grinding cylinder 12 must be withdrawn from the working zone perpendicularly to the plane of the drawing in FIG. 8 during each such traverse. For as long as the grinding cylinder 12 is in the region of a tooth flank of the imaginary annular gear wheel 1, it will machine the corresponding parts of the teeth of the pinion 2. The parts of the tooth contour of the pinion 2, that are not to be ground, have been machined to a correspondingly greater depth during the roughing-out of the pinion 2 as indicated at 53. If the pinion 2 satisfies the condition that its number of teeth bears the same number of teeth of the annular gear wheel 1 as the rolling circle 10 of the cycloid 9 defining the annular gear wheel 1 tooth contour to its base dircle 10 and if the individual arcs 15 of the cycloid embrace only two neighboring teeth, then a retraction of the grinding cylinder 12, while traversing the gap between the teeth of the annular gear wheel 1, will be unnecessary. In such a case, grinding cylinder 12 grinds both flanks and the crest of the tooth of the pinion 2 in one pass and is withdrawn from engagement with the pinion blank 2 only during return along its circular path 15.

Apparatus which is based on the theory that has just been explained and which is suitable for grinding the tooth flanks of the pinion 2 is illustrated in FIG. 9. Parts corresponding to like parts in FIG. 7 bear the same reference numbers as the latter.

However, contrary to FIG. 7, the part 36 carries a support 55 which itself carries an arm 52 that can swivel about an axis 49. This axis corresponds to point 49 and the arm corresponds to the line 52 in FIG. 8. The grinding cylinder 12 in FIG. 9 corresponds to the grinding wheel 12 in FIG. 8 and is mounted on the arm 52 at a distance 57 from the axis 49. The grinding cylinder 12 may be driven by a motor 58 through a gear transmission 59 and a belt 60 indicated in dot-dash lines. Moreover, a unit 61 is mounted on the arm 52, which withdraws the grinding cylinder 12 upwards out of engagement with the pinion 2 at the appropriate times when the grinding cylinder 12 traverses a gap between two teeth of the imaginary annular gear wheel 1. The arm 52 is slidably guided in a sliding block 62 which is deflectably mounted to swivel about an axis 46 (corresponding to point 46 in FIG. 8). The sliding block 62 is mounted on a shaft 63 in an arm 64. The arm 64 is secured on the gear wheel 26 and rotates together therewith. The distance $R_{44}$ of the shaft 63 from the axis 48 about which the eccentric driven portion of the eccentric shaft 17 carrying the table 37 rotates is equal to the pitch diameter $D_{11}$ of the annular gear wheel 1.

It will be understood from the foregoing explanations that the apparatus according to FIG. 9 complies with the geometrical conditions illustrated in FIG. 8.

Naturally, when work begins, the several parts must be placed into the correct angular positions. In other words, the angular position of the pinion blank 2 prior to grinding not only must be adjusted to the position of the teeth, the shaft 63 that corresponds to point 46 in FIG. 8, must likewise be coplanar with the two axes of the eccentric shaft 17. Moreover, an in-feeding mechanism, not shown, for the grinding cylinder 12 must be provided, since the latter, in practice, cannot remove sufficient material from the tooth flanks of the pinion 2 in a single traversing pass.

Furthermore, the withdrawal of the grinding cylinder 12 from engagement with the pinion 2, that is to be ground, must not take place until the center line of arm 52, corresponding to line 52 in FIG. 8, passes across the tip of an imaginary tooth of the annular gear wheel 1. This is possible because the pinion 2 has been roughed-out with an allowance where the tips of the teeth of the annular gear wheel 1 engage the gap between teeth of the pinion 2, as indicated in FIG. 8 at 53. Moreover, in a kinematic reversal of the described procedure, the arm 52 may remain stationary and the work together with the machine below could be swung about point 49. This has the substantial mechanical advantage of permitting the process to be performed on conventional machine tools.

Finally, it should be observed that the involute 51 of the cycloid 9, as can be readily proved by mathematic calculation, is likewise a hypocycloid. This hypocycloid can also be generated by a gear mechanism of the kind illustrated in FIGS. 4 or 7.

It is completely synchronous with the hypocycloid generating the teeth of the annular gear wheel 1. Each position of point 46 is associated with a particular exactly defined point on the involute 51. If arrangements are made for point 46 on rod 52 not to stand still but continuously to travel on 51 (FIG. 8), and this can be readily accomplished by the above described gearing, then the pinion 2 can be ground by the grinding cylinder 12 as a precise enveloping contour of an annular gear wheel 1. However, this procedure is far more complicated than the above-described method of substituting for the annular gear wheel 1 an equivalent internal gear defined by circular arcs 15, because the pivot point 49 is then stationary.

If FIGS. 8 and 9 of the drawings are carefully considered, it will be seen that the guide arm 64 and the sliding block 62 will collide with the grinding cylinder 12 upon passing through the position nearest the axis 46 or point 46. In an arrangement according to FIG. 9, this cannot be avoided in the case of some relative proportions. However, the difficulty can be easily overcome in a way that will be understood from FIG. 8a. In the arrangement according to FIG. 8a, the arm 64 does not rotate about the axis 48 but about the produced axis 48' of the line connecting 49 and 48. The point 46' which corresponds to point 46 in FIG. 9, rotates about this axis 48' at the end of a radius $R'_{44}$ which bears the same proportion to the radius $R_{44}$ as the distance 49–48' to the distance 49–48. If point 46' is now allowed to rotate about the axis 48' at the same angular speed as the point 46 previously did about its axis 48, then the point 46', which naturally must be located on an extension of arm 52 will always remain on the same ray from point 49 upon which point 46 moves. Hence, an arm rotating about the point 48' at the end of the radius $R'_{44}$ likewise can be provided with a slideway 46' for an extension arm 52'. This arm carries the grinding cylinder 12 at the same distance from point 49 as the guide arm 52, and the grinding cylinder 12 will thus perform the same movements as in the construction according to FIG. 9. However, from the positions of the circles 15 and 44', it will be understood that a collision between the grinding cylinder 12, the arm 64, and its slideway 62 cannot occur. This form of construction is in effect merely a modification of the form of construction according to FIG. 8 which takes advantage of the theorem of sweeping rays.

FIG. 10 illustrates a cycloid 65 which closes upon itself after two revolutions as well as a corresponding equidistant curve 66 for the generation of the teeth of an annular gear wheel 1 having seven teeth. Since the number of teeth is odd, the number of revolutions required for the point generating the cycloid 65 to regain its starting point is even. For the generation of seven teeth the choice is limited to two revolutions as a practical matter. In the case of greater numbers of teeth, for example twenty-one teeth, as illustrated in FIG. 11, it is best to choose a cycloid 67 in which the generating point does not regain the starting position until four revolutions have been completed. This avoids the teeth becoming too flat. FIG. 12 is an example of an annular gear wheel 1 having sixteen teeth in which the generating point on the rolling circle returns to its starting position after three complete revolutions around the base circle to produce cycloid 68. From these few examples, it will be understood that by choosing the number of revolutions of the rolling circle for the generation of a desired number of teeth, it is largely possible to determine the shape of the teeth.

For smaller numbers of teeth, two or three revolutions will usually be quite sufficient.

It follows from what has been said that the above provides means for producing an internally-toothed, hardened, ground annular gear wheel and a corresponding likewise hardened and ground externally-toothed pinion by the generating roll process with a degree of precision that has not hitherto been attainable.

It is apparent, from the foregoing description of the method of copending Application Ser. No. 173,110, that the grinding cylinder 12 must necessarily be relatively small because of the path of movement of its axis of rotation with respect to the annular gear wheel 1. This, in turn, limits the production output of the apparatus used for grinding teeth in accordance with this method.

As compared to the technique of copending Application Ser. No. 173,110, FIGS. 13 through 19 illustrate a method and apparatus which is considerably more efficient and which permits the grinding of annular, internally-toothed gear wheels more rapidly and with a higher degree of efficiency. Another significant advantage of this method is that it is possible to grind any tooth shape desired for annular, internally-toothed gear wheels by the use of the self-generating technique with the highest possible precision. Accordingly, one is not limited to a specific tooth shape when following the self-generating technique for the griding of annular, internally-toothed gear wheels. Thus, one may choose any desired tooth profile, such as, an involute tooth system, a cycloidal gear system or any other gear system particularly suitable for a new and special use.

It is to be understood that, in the practice of this method, the usual rules for proportioning internal gears apply, in which, because of the undercut of the teeth of the pinion and because of the danger of collision of the pinion teeth and the teeth of the internal gear, when a small difference in the number of teeth exists, specific principles must be observed or adhered to.

In accordance with this method, the base of the gap of the tooth is worked free to such an extent that it will no longer be touched by the grinding wheel during the grinding of the tooth flanks. The crest of the teeth may remain sharp-edged. However, they may also be ground over cylindrically, if that is desired.

Referring to FIGS. 13 through 19, the grinding wheel 69 is rotated about an axis extending parallel to the plane of the fixed circle 10 and, in a cross section through its axis of rotation parallel to the plane of the fixed circle 10', has a circumferentially-disposed grinding profile 70 which is equal to a part of the profile of an imaginary pinion 2 adapted to mesh with the finished internal gear 1 and whose pitch or rolling circle is equal to the fixed circle 10'. In this connection, the profile of grinding wheel 69, including the elements supporting and driving grinding wheel 69, should be positioned within the contour of the afore-mentioned pinion 2 so that the elements supporting the grinding wheel 69 and the out-of-contact, diametrically-opposed portion 71 of the grinding wheel 69 will not collide with the internal gear 1. The portion 71 of the grinding wheel 69 actually must be maintained a certain distance from the contour or outline of the imagined pinion 2 since, in the beginning of the operation, the grinding wheel 69 must become immersed or pass through the internal gear 1, which still carries the grinding overmeasure, and only after such immersion can it be fed radially outwardly with respect to the afore-mentioned fixed circle 10'.

In the method as explained above, preferably only the internal gear 1 moves, while the movement of the grinding wheel 69, with the exception of the rotation thereof, is confined to the infeed thereof radially outwardly as indicated by the arrow 72.

By virtue of this construction, it is possible to include in the machine for carrying out the method a simple firm or fixed means for truing the grinding wheel 69 which permits imparting to the grinding wheel 69 the desired grinding profile 70 with an extremely high degree of precision.

By causing the annular gear 1 to rotate about the imaginary, stationary pinion 2 with a tooth of the pinion 2 immersed in the annular gear 1, the annular gear 1 is formed by the circumferential portion 70 of the grinding wheel 69. Since, during the rotation or rolling-off of the annular gear 1 about the imaginary pinion 2 (i.e. during the rotation or rolling-off of the rolling or pitch circle 11 of the annular gear 1 about the above-mentioned fixed circle 10', which is equal to the rolling circle of the imagined pinion 2), this tooth passes through every possible relative position of a tooth of pinion 2 with respect to the annular gear 1, the annular gear 1 may, in this manner and while using a large grinding disc, be effectively ground by the hobbing method. The grinding wheel or disc 69 may have a diameter which is only slightly smaller than the addendum circle of the imaginary pinion 2.

The imaginary pinion 2, and therewith also the diameter of the grinding wheel 69, whose form or shape must be carefully set or aligned with the outline of the imagined pinion 2, is preferably chosen as large as possible. This, in turn, has the result that in actual practice, the above-mentioned fraction (the ratio of the fixed circle diameter 10' to rolling or pitch circle diameter 11 of the annular gear 1) can be chosen with a value as large as possible.

The circumferential portion 70 of the grinding wheel 69, which will come into engagement with the annular gear 1 to be ground, should have a profile equal to a part of the profile of the pinion 2 extending over at least a portion of the circumference of the latter. The profile of the grinding wheel 69 is advantageously equal to the profile of a tooth of the imaginary pinion 2 and grinding areas may be present on both sides thereof which extend, in each case, over half the tooth space.

During the grinding of internal gears having a relatively large number of teeth, it is also possible, in principle, to make the grinding circumferential portion of the grinding wheel 69 sufficiently large that it will contain or encompass, for example, two divisions or graduations of the imaginary pinion 2. However, this will be suitable only in few cases in practice since, in the present method, it is not possible to work with a laterally sloped-back or concavely ground grinding wheel. However, it is possible, for instance, to provide a tooth not only in the center of the grinding profile of the grinding wheel 69 but also a half tooth on each of the two sides thereof next to the adjacent tooth space of the imaginary pinion 2, as illustrated in FIG. 19.

Such a relatively complicated method of operation has, in turn, the advantage that the previously mentioned, aliquant fraction, whose denominator is equal to the number of teeth of the internal gear need not be adhered to but the fraction can be aliquot. Consequently, in practice, a common divider for the numerator and denominator of the fraction will be possible in some cases. However, such a procedure does result in a certain disadvantage; namely, the grinding precision is reduced insasmuch as, with the shape of the grinding surface of the grinding wheel just mentioned and the common divider for the fraction, every tooth space of the annular gear 1 will not come into hobbing contact with each tooth of the grinding wheel 69.

According to the foregoing, it is thus preferred that the profile of the grinding wheel 69 encloses or encompasses at least one complete tooth of pinion 2. When the imaginary pinion 2 has an even number of teeth, the symmetric line of the profile of this pinion tooth preferably coincides with the symmetric line, present in this case, of the grinding wheel 69 profile, which is positioned at a right angle with respect to the axis of rotation of the grinding wheel 69. In the case of an uneven number of teeth, the last-mentioned condition would render the diameter of the grinding wheel unnecessarily small.

The infeed movement of the grinding wheel 69 takes place preferably in the direction of a radius of the fixed circle 10' as indicated by the numeral 72, and this radius line extends at least approximately through the symmetric line of the grinding profile of the grinding wheel 69. In other words, the infeed direction should be the radius of the imaginary pinion gear 2, which extends through the center of the circumferentially-disposed grinding area 70 of the grinding wheel 69.

In the method as proposed by the present invention, the movement of the annular gear 1 is produced preferably by rotating or turning the annular gear 1 about its axis at a specfic speed of revolution, and superimposing on this rotation a second rotation about a second axis parallel to the axis of the annular gear 1. The distance of these two axes with respect to each other is equal to the difference between the radius of the rolling or pitch circle 11 of the annular gear 1 and the radius of the fixed circle 10', and the speed of rotation of the annular gear 1 about its axis to the speed of rotation of the superimposed rotation will be equal to the difference between the radius of the rolling or pitch circle 11 and the radius of the fixed circle 10' to the radius of the rolling or pitch circle 11.

The method may also be so carried out, in principle, by first grinding the left flanks or right flanks of all the teeth of the annular gear 1 and thereafter grinding the right flanks or left flanks, respectively. In order to achieve this goal, the thickness of the circumferential grinding surface 70 of the grinding wheel 69, grinding the tooth space and/or spaces of the annular gear 1, is made somewhat thinner than the teeth of the imaginary pinion 2. After the grinding of the left or right flanks, the grinding wheel 69 is twisted about a small angle about the axis along which it is reciprocated during grinding, so that thereafter all of the right or all of the left flanks of the annular gear 1 will come into engagement with the grinding wheel 69. This reduces the stress of the grinding wheel 69 and makes it possible to utilize a drive means with a lower torque.

Referring to FIGS. 13 through 15, the apparatus to carry out this method comprises an eccentric shaft 17 consisting of two parts 17a and 17b which are eccentric with respect to each other, the driving portion 17a of which shaft is rotatably positioned in a base or support 18, and the eccentricity of the two eccentric shaft parts 17a and 17b is equal to the difference between the radius of rolling circle 11 and the radius of the fixed circle 10'; a table 19 is rotatably positioned on the free or driven portion 17b of the eccentric shaft 17, upon which table the annular gear 1 is mounted or clamped; a gear system driving the eccentric shaft 17 and the rotatable table 19 at different speeds of rotation, whereby the speed of rotation of the table 19, which is rotatably positioned on the driven portion 17b, to the speed of rotation of the driving portion 17a of eccentric shaft 17 is equal to the radius of the rolling circle 11 of the annular gear 1 minus the radius of the fixed circle 10' to the radius of rolling circle 11; and a grinding wheel 69 whose support 73 is reciprocatable parallel to the axes of the eccentric shaft 17. The apparatus is further characterized in that the axis of rotation of the grinding wheel 69 is positioned in a plane perpendicular to the axes of the eccentric shaft 17, in operation, the grinding wheel 69 is only reciprocatable but not rotatable, except where one flank of all teeth is ground followed by the other flank, the circumferentially-disposed grinding portion 70 or zone of engagement is equal to a part of the profile of the pinion 2, which is adapted to mesh with the finished annular gear 1 and whose rolling or pitch cirlce is equal to the fixed circle 10', and, the circumferentially-disposed profile of the grinding wheel 69 and the positioning thereof is such that the cross section of the grinding wheel 69, through the axis 74 thereof parallel to the plane of fixed circle 10', is within the profile of the imaginary pinion 2.

As indicated, the device or apparatus shown schematically in the drawings, which is designed for carrying out the proposed method, has a stand or support 18 on which a rotary table 19 is rotatably positioned and which serves to support the annular, internal, roughed-out, gear blank 1 to be ground. The construction, or provision, of the rotary table 19 is more clearly visible in FIG. 14. It is apparent therefrom that the eccentric shaft 17 is rotatably positioned in a spindle bearing 20 and consists of an upper or driven portion 17b and a lower or driving portion 17a which are eccentric relative to each other. The eccentric shaft 17 is freely rotatable within the bearing 20 and carries on the upper side thereof, rotatably positioned about the axis of the eccentric 17b, the machine tool table 19. The latter is equipped at the top or upper side thereof with a means for receiving the annular gear 1 to be ground.

It is apparent from FIGS. 14 and 15 that, by means of the elements described hereinbefore, a rotation of the annular gear 1, positioned concentrically with respect to the axis of the eccentric 17b of the eccentric shaft 17, is possible, which results in a rolling-off or hobbing of the annular gear 1 on the pinion 2 shown in dash-dotted lines in FIG. 15. The axis of the pinion 2, being imagined as stationary, is in this case the axis of the lower eccentric 17a of the eccentric shaft 17. The axis of the upper eccentric part 17b is, in this case, the axis of the annular gear 1. Now, when the eccentric shaft 17 is rotated within the housing 20, the annular gear 1 is adapted to carry out precisely the movement which it would execute if it were to hob or roll-off the stationary imagined pinion 2. This, however, is, in turn, the movement which the rolling or pitch circle 11 of the annular gear 1 would execute if it were to hob or roll-off the above-mentioned stationary fixed circle 10, which is equal to the rolling or pitch circle of the pinion 2.

Further, it can be seen that, for the purpose of forcing, or forcibly bringing about, the rolling-off or hobbing movement explained above, because of the nonexistence of the imagined pinion 2, all that is needed is an additional drive which, during the rotation of the eccentric 17a within the bearing 20, superimposes on the table 19 a corresponding, specific rotary speed or speed of rotation about the axis 17b. The exact speed of rotation has been indicated more precisely in the introduction to the specification hereinabove.

In order to produce this rotary movement, for example, the gear mechanism indicated in FIG. 14 can be used. This gear mechanism consists essentially of a driving flange 19 which is rotatably positioned essentially of a driving flange 19 which is rotatably positioned about the bearing 20 and may be driven, for example, by means of a schematically indicated drive motor 29 and an outer gear tooth system, in rotation about the bearing 20. Rotatably positioned in the driving flange 19 are two pinions 24 and 25. Furthermore, both pinions are positioned with the shafts thereof in a flange 23, non-rotatably mounted on the eccentric 17b of the shaft, so that, during the rotation of the driving flange 19 about the bearing 20, the eccentric 17b rotates at the same speed of rotation about the axis of the lower part 17a thereof. In order that the rotary movement of the table 19 does not remain a simple lunar movement, the pinion 25, which is also meshed with the pinion 24, meshes with a stationary tooth system 26 at the upper edge of the bearing 20. The pinion 24, which is rotated counterclockwise by pinion 25, will, in turn, mesh with an internal gear system 27 at the bottom of the table 19 which forces upon the latter the desired rotation.

The drive system explained hereinabove is intended to be only schematic. The principle of this drive system, however, is of particular advantage in actual practice because of its simplicity.

When the driving flange 19 is rotated, the annular gear 1, mounted or clamped on to the table 19, executes precisely the movement which it would execute if it were hobbing or rolling-off the imaginary pinion 2.

As is apparent from FIG. 13, a lateral arm 75 of the base or support 18 carries at the top thereof an arm 76 upon which a slide means 77 is displaceable along the arm 76. Provided on the slide means 77 is again a schematically indicated transverse slide means 78 which also admits, or allows for, a small displacement vertically or at a right angle with respect to the arm 76 in both directions. Provided in the slide means 78, in an adjustable manner with regard to rotation about a vertical axis, is a bearing 79 for the grinding wheel or disc 69 which is adapted to be moved up and down in a manner not illustrated herein. The bearing 79 is provided at the top with a drive 80 for the grinding wheel or disc 69, this drive not being further explained herein. In the arrangement disclosed and referred to herein, it is essential that the grinding wheel or disc 69, be rotatable about a horizontal axis 74, be adapted to be reciprocatable or movable up and down for the operation, that it, furthermore, be adjustable as to rotation about a vertical axis, and that it be adjustable about a horizontal axis disposed in FIG. 13 in the drawing plane and a further horizontal axis positioned at a right angle to the drawing plane in FIG. 13.

The base or support 18 further carries a truing attachment or device 81 for the grinding wheel 69. The truing device 81 has not been further explained herein since it is known per se. For the purpose of truing, the grinding wheel 69 is simply driven upwardly out of the engagement with the annular gear blank 1 clamped on to the table and then driven toward the right into engagement with the truing device 81, where the grinding wheel 69 will again obtain the precise profile determining the gear tooth system of the annular gear 1, which profile had been worn off during the use thereof.

Visible in FIG. 15 is, in addition to the cross section through the annular gear 1, also the horizontal cross section taken through the axis 74 of the grinding wheel 69. Shown therein by the arrow 72 is the feed direction of the grinding wheel 69, used in this embodiment, which coincides here with the shifting or displacement of the slide means 77 on the arm 76. Illustrated moreover in FIG. 13 are the two supporting arms 73, carrying the grinding wheel shaft 74, which are adapted to be moved up and down in the direction of the arrow in FIG. 14. The drive of the grinding wheel 69 takes place, in this embodiment, through a toothed belt 82 extending around the belt pulley 83 of the shaft 74.

It is further visible in, or apparent from FIG. 15, that the grinding wheel 69 has a circumferential profile which corresponds precisely to that of a tooth of the imagined pinion 2 meshing with the annular gear 1. The symmetric line 72 of this pinion tooth profile, in the example, is not positioned perpendicular with respect to the axis of rotation 74 of the grinding wheel 69, since the number of teeth of the pinion is uneven and a perpendicular arrangement of the pinion tooth profile relative to the shaft 74 would call for a considerably smaller grinding wheel. As is apparent from the drawing, the illustrated oblique disposition of the symmetric line 72 of the pinion tooth profile with respect to the grinding wheel axis 74 has the effect that the rearward side 71 of the grinding wheel 69, which is not in engagement, is positioned in the contour of a further pinion tooth. This permits maximizing the size of the grinding wheel 69. In the case of a pinion having an even number of teeth, this oblique arrangement is, of course, not required. It is moreover apparent from the drawing that the grinding wheel 69 does not have grinding surfaces for grinding the addenda of the teeth since the annular gear teeth, as shown, merely have a sharp edge. Even if the annular gear teeth have top surfaces, these will advantageously not be ground with the grinding wheel 69, but separately on a simple circular grinding machine.

As is further apparent from the drawing, the grinding wheel 69, in the cross section illustrated in FIG. 15, must not, on the non-grinding side 71 thereof, completely fill the profile of the imagined pinion 2, since the grinding wheel 69, prior to the finish grinding is not yet in the definitive position in which the grinding surface thereof is precisely in engagement with the finished tooth surface of the annular gear 1. If, in the last-mentioned position, the non-grinding side 71 of the grinding wheel 69 did completely fill the profile of the left tooth, adjacent side 71, it would grind, at the beginning of the grinding operation in the not yet fully fed condition, undesirably deeply into the tooth flanks opposite the side 71 of the annular gear 1 being hobbed or rolled-off, thus leading to scrap.

It is particularly evident from FIG. 15 that, for the hobbing or rolling movement of the annular gear 1, such as shown about the imagined pinion 2 and the stationary tooth of this pinion, whose surface is replaced in operation by the rotating grinding wheel 69 moving up and down, is so ground that it will assume precisely that tooth shape which is defined by the circumferentially-disposed profile 70 of the grinding wheel 69. As a result, even difficult tooth shapes for internal gears, which are not possible otherwise, can be ground by the method proposed by the present invention in accordance with the hobbing or self-generating method with a high grinding output or efficiency and the highest degree of precision.

FIG. 16, shows a vertical cross-section through the center of a modified form of drive system for the apparatus just described. In accordance with FIG. 16, the driving portion 17a of the eccentric shaft 17 is rotatably mounted in the frame 18 of the engine. Shaft 17 is directly driven, as by a motor as shown in FIG. 14, in the direction $W_E$. Fixed sun gear means 20 is nonrotatably attached to frame 18 and is provided with external gear teeth 26. Instead of utilizing a rotatable sun gear 19 and a flange 23 fixed to the driven portion 17b of the shaft 17 to drive the planet gears 24 and 25 about the axis of driving portion 17a of shaft 17, as in FIG. 14, the driving portion 17a is directly driven, as previously mentioned, and flat, annular plate or ring 84 is fixedly coupled to the driving portion 17a of shaft 17 and rotates therewith. Ring 84 has rotatably mounted thereon, and depending downwardly therefrom, the planet gears 24 and 25. This mounting is accomplished through mounting plate 85, as will be described in greater detail hereinafter. Rotatably mounted on the driven portion 17b of shaft 17 is work table 19 adapted to support the internally-toothed gear blank 1 (FIG. 14). Formed adjacent the lower portion of table 19 is internally-toothed ring gear 27. Gear 27 is larger than gear 26 and surrounds gear 26 with the planet gears 24 and 25 therebetween. As is apparent, the axis of gear 27 and the axis table 19 and, hence, of the gear blank 1 coincide with the axis of driven portion 17b of shaft 17. In operation, portion 17a of shaft 17 is rotated in the direction $W_T$ thereby carrying with it, at the same speed and in the same direction ring 84 and the planet gears 24 and 25. The external teeth 26 of fixed sun gear 20 rotate planet gear 25 as gear 25 is driven around gear 26. Planet gear 25, in turn, rotates planet gear 25 in the opposite direction. The rotation of planet gear 24 rotates gear 27 attached to table 19 and, thus, table 19 in the direction $W_T$. It is thus apparent that the mechanism of FIG. 16 operates in the same manner as that of FIG. 14. However, it is to be noted that the mechanism of FIG. 16 permits the structure of the engine to be extremely flat and permits one to utilize a series of flat plates and annular rings which can be accurately machined and assembled. Consequently, there will be no wobble or out-of-line operation of the table 19, and, therefore, extreme accuracy in the grinding of the teeth of the gear blank can be attained.

A further advantage of the mechanism of FIG. 16 is illustrated by FIGS. 17 and 18. Planet gears 24 and 25 are rotatably mounted on axles 86 and 87, respectively. Axles 86 and 87 are, in turn, fixedly mounted in mounting plate 85 by means of pins 88 and 89, respectively. Plate 85 is held in place on ring 84 by means of generally-L-shaped clamps 90 and 91. Clamps 90 and 91 are held in frictional engagement with plate 85 by means of bolts 92 and 93, respectively. This method of mounting of planet gears 24 and 25 thus permits the replacement of gears 24 and 25 and plate 85 or the adjustment of the position of gears 24 and 25 to accommodate different distances between gear 26 and gear 27. Therefore, as previously indicated, gear 27 can be built into the engine, gear 26 can be replaceable and gears 24 and 25 can be adjusted to properly mesh between gear 27 and a replacement for gear 26.

FIGS. 20, 21 and 22 illustrate apparatus for grinding the flanks of externally-toothed pinions in accordance with the present invention. The same criteria and mode of operation, which apply to the eccentric drive mechanisms of FIGS. 7, 8, 8a and 9, apply to the eccentric mechanism of these Figures; and the same criteria and mode of operation, which apply to the grinding mechanism of FIGS. 13, 14, 15 and 19, apply to the grinding mechanism of these Figures. Hence, numbers indicating corresponding parts of the elements and subcombinations in the previous Figures are applied to the elements and subcombinations of these Figures 20, 21 and 22.

It will be obvious to those skilled in the art that many modifications may be made within the scope of the present invention without departing from the spirit thereof, and the invention includes all such modifications.

We claim:

1. An apparatus for grinding the tooth flanks of a roughed-out, annular, internally-toothed gear wheel, comprising, a stationary base means; an eccentric shaft means having a driving portion, rotatably mounted in said base means, and a driven portion; a table means adapted to support said roughed-out gear wheel concentrically with respect to said driven portion of said eccentric shaft means, rotatably mounted on said driven portion of said eccentric shaft means; grinding wheel means mounted adjacent said table means, rotatable about an axis parallel to the plane of said roughed-out gear wheel, reciprocatable through the interior of said roughed-out gear wheel along an axis parallel to the axes of said driving portion and said driven portion of said eccentric shaft means, having a circumferentially-disposed grinding surface whose cross-sectional profile through its axis of rotation is equivalent to at least a part of the profile of at least one tooth of an externally-toothed pinion, adapted to mesh with the finished gear wheel, and adapted to grind said tooth flanks of said roughed-out gear wheel; and a plurality of gears meshing with each other, one of said gears being operatively coupled to said driven portion of said eccentric shaft means and said table means to drive said table means and the other of said gears being operatively coupled to said driven portion of said eccentric shaft means to drive said table means and said driven portion of said eccentric shaft means at different speeds of rotation.

2. Apparatus in accordance with claim 1, wherein the distance between the axis of the driving portion and the axis of the driven portion of the eccentric shaft means is substantially equal to the difference between the radius of the pitch circle of the roughed-out gear wheel and the pitch circle of the pinion and the ratio of the speed of rotation of the roughed-out gear wheel to the speed of rotation of said driven portion of said eccentric shaft is substantially equal to said difference between the radius of the pitch circle of the roughed-out gear wheel and the pitch circle of the pinion to said radius of the pitch circle of the roughed-out gear wheel.

3. Apparatus in accordance with claim 1 wherein an externally-toothed sun gear is fixedly coupled to the base means, an annular, internally-toothed driven gear having a diameter larger than the diameter of said sun gear is fixedly coupled to the table means and the plurality of gears is a planetary gear means disposed between said sun gear and said driven gear.

4. Apparatus in accordance with claim 3, wherein the planetary gear means is a pair of externally-toothed gears which mesh with one another, one of which meshes with the sun gear and the other of which meshes with the driven gear.

5. Apparatus in accordance with claim 4 wherein the planetary gear means is replaceable and one of the sun gear and the driven gear is replaceable.

6. Apparatus in accordance with claim 5, wherein the driven gear is replaceable.

7. Apparatus in accordance with claim 3, wherein the sun gear, the planetary gear means and the driven gear all mesh in a single plane.

8. Apparatus in accordance with claim 3, wherein the planetary gear means is replaceable and one of the sun gear and the driven gear is replaceable with a gear having a different diameter.

9. Apparatus in accordance with claim 8, wherein the driven gear is replaceable.

10. Apparatus in accordance with claim 1, wherein infeed means is operatively coupled to the grinding wheel to feed said grinding wheel along a radius of the driving portion of the eccentric shaft means and said radius of said driving portion of said eccentric shaft substantially coincides with the axis of symmetry of the circumferentially-disposed grinding portion of the grinding wheel.

11. Apparatus in accordance with claim 1, wherein the profile of the grinding wheel is equivalent to one full tooth of the pinion.

12. Apparatus in accordance with claim 1, wherein the profile of the grinding wheel is equivalent to two full teeth of the pinion.

13. Apparatus in accordance with claim 1, wherein the grinding wheel diameter is slightly smaller than the diameter of the addendum circle of the pinion.

14. Apparatus in accordance with claim 1, wherein the roughed-out gear wheel has an odd number of teeth and the grinding wheel has a cross-sectional profile smaller than the profile of the pinion so as to fit within at least one tooth space of the tooth flanks of said gear wheel being ground and within at least one tooth space of said gear wheel on the side of said gear wheel opposite the first-mentioned tooth space.

15. Apparatus in accordance with claim 10, wherein a truing means is fixedly mounted adjacent the grinding wheel and said grinding wheel is operatively displaceable into contact with said truing means and adjustable to true the grinding surface thereof.

16. Apparatus in accordance with claim 1, wherein the ratio of the speed of rotation of the table means about the axis of the gear wheel to the speed of rotation of the driven portion of the eccentric shaft means about the driving portion of said eccentric shaft means is substantially equal to the difference between the radius of the pitch cycle of the roughed-out gear wheel and the radius of the pitch circle of the pinion to the radius of the pitch cycle of the gear wheel.

17. An appartus for grinding the tooth flanks of a roughed-out, annular, internally-toothed gear wheel, comprising, a stationary base means; an eccentric shaft means having a driving portion rotatably mounted in said base means; a table means, adapted to support said roughed-out gear wheel concentrically with respect to the driven portion of said eccentric shaft means, rotatably mounted on said driven portion of said eccentric shaft means; grinding wheel means mounted adjacent said table means, rotatable about an axis parallel to the plane of said roughed-out gear wheel, reciprocatable through the interior of said roughed-out gear wheel along an axis parallel to the axes of said driving portion and said driven portion of said eccentric shaft means, having a circumferentially-disposed grinding surface whose cross-sectional profile through its axis of rotation is equivalent to at least a part of the profile of at least a part of at least one tooth of an externally-toothed pinion, adapted to mesh with the finished gear wheel, and adapted to grind said tooth flanks of said roughedout gear wheel; an externally-toothed sun gear fixedly coupled to said base means; an annular internally-toothed driven gear, having a diameter larger than the diameter of said sun gear, fixedly coupled to said table means; one of said sun gear and said driven gear being replaceable by a gear of different diameter; and a pair of externally-toothed gears, which mesh with other another and which are adjustable to make one of said pair of gears mesh with the replaced one of said sun gear and said driven gear and the other of said pair of gears mesh with the other of said sun gear and said driven gear.

18. Apparatus in accordance with claim 17, wherein the driven gear is replaceable.

19. An apparatus for grinding the tooth flanks of a roughed-out, externally-toothed pinion, comprising, a stationary base means; an eccentric shaft means having a driven portion rotatably mounted in said base means, and a driving portion; a table means, adapted to support said roughed-out pinion concentrically with respect to said driving portion of said eccentric shaft means, rotatably mounted on said driving portion of said eccentric shaft means; grinding wheel means mounted adjacent said table means, rotatable about an axis parallel to the plane of said roughed-out pinion, reciprocatable through the exterior of said roughed-out pinion along an axis parallel to the axes of said driving portion and said driven portion of said eccentric shaft means, having a circumferentially-disposed grinding surface adapted to grind said tooth flanks of said roughed-out pinion; and a plurality of gears meshing with each other, one of said gears being operatively coupled to said driven portion of said eccentric shaft means and said table means and the other of said gears being operatively coupled to said driven portion of said eccentric shaft means to drive said table means and said driven portion of said eccentric shaft means at different speeds of rotation.

20. Apparatus in accordance with claim 19, wherein the distance between the axis of the driving portion and the axis of the driven portion of the eccentric shaft means is substantially equal to the difference between the radius of the pitch circle of the gear wheel and the radius of the pitch circle of the roughed-out pinion and the ratio of the speed of rotation of the roughed-out pinion about its axis to the speed of rotation of the driving portion of said eccentric shaft means about said axis of said driven portion of said eccentric shaft means is substantially equal to said difference between the radius of the pitch circle of the gear wheel and the radius of the pitch circle of the pinion to said radius of the pitch circle of the roughed-out pinion.

21. Apparatus in accordance with claim 19 wherein an externally-toothed sun gear is fixedly coupled to the base means, an annular, internally-toothed driven gear having a diameter larger than the diameter of said sun gear is fixedly coupled to the table means and the plurality of gears is a planetary gear means disposed between said sun gear and said driven gear.

22. Apparatus in accordance with claim 21 wherein the planetary gear means is a pair of externally-toothed gears which mesh with one another, one of which meshes with the sun gear and the other of which meshes with the internally-toothed gear.

23. Apparatus in accordance with claim 22 wherein the planetary gear means is replaceable and one of the sun gear and the internally-toothed gear is replaceable.

24. Apparatus in accordance with claim 23 wherein the internally-toothed gear is replaceable.

25. Apparatus in accordance with claim 21 wherein the sun gear, the planetary gear means and the internally-toothed gear all mesh in a single plane.

26. Apparatus in accordance with claim 21 wherein the planetary gear means is replaceable and one of the sun gear and the internally-toothed gear is replaceable with a gear having a different diameter.

27. Apparatus in accordance with claim 26 wherein the sun gear is replaceable.

28. Apparatus in accordance with claim 19 wherein infeed means is operatively coupled to the grinding wheel to feed said grinding wheel along a radius of the driving portion of the eccentric shaft means and said radius of said driving portion of said eccentric shaft substantially coincides with the axis of symmetry of the circumferentially-disposed grinding portion of said grinding wheel.

29. Apparatus in accordance with claim 19 wherein the profile of the grinding wheel is equivalent to one full tooth of the gear wheel.

30. Apparatus in accordance with claim 19 wherein the profile of the grinding wheel is equivalent to two full teeth of the gear wheel.

31. Apparatus in accordance with claim 19 wherein a truing means is fixedly mounted adjacent the grinding wheel and said grinding wheel is operatively displaceable into contact with said truing means and adjustable to true the grinding surface thereof.

32. Apparatus in accordance with claim 19 wherein the grinding wheel is mounted on an arm pivotable about an axis fixed in relation to the base means and parallel to the axis of the eccentric shaft, said axis of said arm being offset from the axis of the first shaft part at a distance such that a circular arc about said axis of said arm approximates and envelops the contours of two tooth flanks of the gear wheel, the center of the internal contour of said gear wheel coincides with the axis of the driving portion of the eccentric shaft, and said grinding wheel is mounted such that its enveloping curve during pivoting about said axis of said arm traverses said circular arc, and means for axially displacing said grinding wheel into engagement and out of engagement with said pinion, said arm being slidably guided in ways rotating synchroneously with the driven portion of the eccentric shaft around said axis of said driven portion, said ways lying in the plane containing the axes of said two shaft portions, and the radius of the circle on which said ways rotates around said axis of said driving portion of said eccentric shaft being equal to said radius of the pitch circle of said gear wheel.

33. Apparatus in accordance with claim 32 wherein the circular arc approximates and envelops the contour of two relatively remote tooth flanks of two neighboring teeth of the gear wheel.

34. An apparatus for grinding the tooth flanks of a roughed-out, externally-toothed pinion, comprising, a stationary base means; an eccentric shaft means having a driven portion rotatably mounted in said base means; a table means, adapted to support said roughed-out pinion concentrically with respect to the driving portion of said eccentric shaft means, rotatably mounted on said driving portion of said eccentric shaft means; grinding wheel means mounted adjacent said table means, rotatable about an axis parallel to the plane of said roughed-out pinion, reciprocatable through the exterior of said roughed-out pinion along an axis parallel to the axes of said driving portion and said driven portion of said eccentric shaft means, having a circumferentially-disposed grinding surface adapted to grind said tooth flanks of said roughed-out pinion; an externally-toothed, driven sun gear fixedly coupled to said table; an annular, internally-toothed gear having a diameter larger than the diameter of said sun gear and fixedly coupled to said base; one of said sun gear and said internally-toothed gear being replaceable by a gear of different diameter; and a pair of externally-toothed gears, which mesh with one another and which are adjustable to make one of said pair of gears mesh with the replaced one of said sun gear and said internally-toothed gear and the other of said pair of gears mesh with the other of said sun gear and said internally-toothed gear.

35. Apparatus in accordance with claim 34, wherein the internally-toothed gear is replaceable.

36. A method for grinding the tooth flanks of a roughed-out, annular, internally-toothed gear wheel; comprising rolling one of the pitch circle of said roughed-out gear wheel and a fixed circle, having a diameter equal to the pitch circle of an externally-toothed pinion and adapted to mesh with the finished internally-toothed gear wheel formed from said roughed-out gear wheel, off the other; and, simultaneously with said rolling-off, rotating a grinding wheel on an axis parallel to the plane of said roughed-out gear wheel and reciprocating said grinding wheel through the interior of said roughed-out gear wheel along an axis parallel to the axis of said pitch circle of said roughed-out gear wheel and the axis of said fixed circle, while maintaining said axis of reciprocation of said grinding wheel a fixed distance from said axis of said fixed circle during the actual grinding of said tooth flanks, except for normal infeed of said grinding wheel; said grinding wheel having a circumferentially-disposed grinding surface whose cross-sectional profile has a shape equivalent to the profile of at least a part of at least one tooth of said pinion; the transverse thickness of the profile of the grinding wheel being smaller than the pitch of one tooth of the pinion, all of one of the right hand tooth flanks of the roughed-out gear wheel and the left hand tooth flanks of said gear wheel being ground first, said gear wheel being indexed an amount sufficient to bring the other of said right hand and left hand tooth flanks in contact with the grinding surface of said grinding wheel and thereafter grinding all of said other right hand and left hand tooth flanks; and the ratio of the diameter of said fixed circle to the diameter of said pitch circle of said gear wheel being an aliquant fraction whose denominator is equal to the number of teeth of said gear wheel and whose numerator is at least 2 and not more than said number of teeth of said gear wheel minus 2.

37. A method for grinding the tooth flanks of a roughed-out, externally-toothed pinion; comprising rolling one of the pitch circle of said roughed-out pinion and a fixed circle, having a diameter equal to the pitch circle of an annular, internally-toothed gear wheel, adapted to mesh with the finished pinion formed from said roughed-out pinion, off the other to produce a first rotation; simultaneously with said first rotation, rotating a grinding wheel on an axis parallel to the plane of said roughed-out pinion and reciprocating said grinding wheel through the exterior of said roughed-out pinion along an axis parallel to the axis of said pitch circle of said roughed-out pinion and the axis of said fixed circle along a circular arc in a plane normal to the axis of the pinion, said arc enveloping and approximating the contours of the two outermost flanks of a group of at least two adjacent teeth of the gear wheel, the center of the internal contour of said pinion coinciding with the center of the second axis, the radius line from said center of said arc through said grinding wheel always passing through a point on the pitch circle of said pinion, and said point always lying on a radius line of said center of said second axis through said axis of said pinion; said grinding wheel having a circumferentially-disposed grinding surface; and superimposing a second rotation about a second axis, parallel to the axis of said first rotation, on said first rotation, the distance between said axis of said first rotation and said second axis being substantially equal to the difference between the radius of the fixed circle and the radius of the pitch circle of said roughed-out pinion and the ratio of the speed of rotation about said second axis to the speed of said first rotation about its axis being substantially equal to the radius of said pitch circle of said roughed-out pinion to said difference between the radius of the fixed circle and the radius of the pitch circle of said roughed-out pinion, said first and second rotation being in opposite directions.

38. A method in accordance with claim 37 wherein the grinding wheel, after traversing a part of the arc, corresponding to a first one of the two tooth flank contours, is disengaged from the pinion by displacement in the direction of the axis of said grinding wheel and, after having traversed the gap between said contours of said two flanks, is reengaged with said pinion, and these steps are repeated until all the teeth flanks of said pinion are ground.

39. A method in accordance with claim 37 wherein the pinion has an odd number of teeth, the ratio of said odd number of teeth to the number of teeth of the gear wheel is equal to the ratio of a rolling circle producing a cycloid by rolling on the interior of the base circle of said cycloid and the radius of said base circle, the grinding wheel is moved along the arc about the center of said arc in the same direction as the direction of rotation of said pinion about its axis, a tooth flank is ground on the trailing side of a tooth during said movement, said grinding wheel is axially disengaged from said pinion, said grinding wheel is reengaged with said pinion, when said grinding wheel has reached the next tooth space of said pinion, the leading flank of the tooth trailing said space is ground, said grinding wheel is disengaged from said pinion, said grinding wheel is moved back along said arc to a position where it can be engaged with the tooth space trailing after said next tooth space, said trailing tooth space having in the meantime reached a position in which said grinding wheel can be engaged with the trailing flank of the tooth between said next tooth space and said trailing tooth space, and said grinding wheel is reengaged with the last-mentioned tooth flank, and these steps are repeated until all the tooth flanks of said pinion are ground.

40. A method for grinding the tooth flanks of a roughed-out, externally-toothed pinion; comprising, rolling one of the pitch circle of said roughed-out pinion and a fixed circle, having a diameter equal to the pitch circle of an annular, internally-toothed gear wheel, adapted to mesh with the finished pinion formed from said roughed-out pinion, off the other; and simultaneously with said rotation, rotating a grinding wheel on an axis parallel to the plane of said roughed-out pinion, reciprocating said grinding wheel through the exterior of said roughed-out pinion along an axis parallel to the axis of said pitch circle of said roughed-out pinion and the axis of said fixed circle, while maintaining said axis of reciprocation of said grinding wheel a fixed distance from said axis of said fixed circle during the actual grinding of said tooth flanks, except for normal infeed of said grinding wheel, said grinding wheel having a circumferentially-disposed grinding surface and having a transverse thickness smaller than the pitch of one tooth of said pinion, first grinding all of one of the right hand tooth flanks of said roughed-out pinion and the left hand tooth flanks of said pinion, indexing said pinion an amount sufficient to bring the other of said right hand and left hand tooth flanks in contact with the grinding surface of said grinding wheel and, thereafter, grinding all of said other right hand and left hand tooth flanks.

* * * * *

UNITED STATES PATENT OFFICE
CERTIFICATE OF CORRECTION

Patent No. 4,058,938            Dated November 22, 1977

Inventor(s) Hermann Härle and Siegfried Eisenmann

It is certified that error appears in the above-identified patent and that said Letters Patent are hereby corrected as shown below:

Item [73], line 2 thereof, "Huttenver Waltung" should read --- Huttenverwaltung ---.

Column 23, line 55, "10" should read --- 1 ---.

Column 24, line 1, "appartus" should read --- apparatus ---.

Signed and Sealed this

Fourteenth Day of March 1978

[SEAL]

Attest:

RUTH C. MASON
*Attesting Officer*

LUTRELLE F. PARKER
*Acting Commissioner of Patents and Trademarks*